US009602864B2

(12) United States Patent
Cholas et al.

(10) Patent No.: US 9,602,864 B2
(45) Date of Patent: Mar. 21, 2017

(54) MEDIA BRIDGE APPARATUS AND METHODS

(75) Inventors: Chris Cholas, Frederick, CO (US);
William L. Helms, Longmont, CO (US); Jeffrey P. Markley, Superior, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 989 days.

(21) Appl. No.: 12/480,597

(22) Filed: Jun. 8, 2009

(65) Prior Publication Data
US 2010/0313225 A1    Dec. 9, 2010

(51) Int. Cl.
*H04N 21/433* (2011.01)
*H04N 21/436* (2011.01)
*H04N 7/173* (2011.01)
*H04N 21/4402* (2011.01)
*H04N 21/472* (2011.01)
(Continued)

(52) U.S. Cl.
CPC ..... *H04N 21/4332* (2013.01); *H04N 7/17318* (2013.01); *H04N 21/25875* (2013.01); *H04N 21/26258* (2013.01); *H04N 21/4126* (2013.01); *H04N 21/4334* (2013.01); *H04N 21/43615* (2013.01); *H04N 21/4402* (2013.01); *H04N 21/47214* (2013.01)

(58) Field of Classification Search
None
See application file for complete search history.

(56) References Cited

U.S. PATENT DOCUMENTS 5,369,707 A    11/1994   Follendore, III
5,528,284 A     6/1996   Iwami et al.
(Continued)

FOREIGN PATENT DOCUMENTS

EP    1139198 A2    10/2001
EP    2113860 A1    11/2009
(Continued)

OTHER PUBLICATIONS

OpenCableTM Specifications Home Networking; Home Networking Security Specification; OC-SP-HN-DO1-081027 (Oct. 27, 2008).
(Continued)

*Primary Examiner* — Omar S Parra
(74) *Attorney, Agent, or Firm* — Gazdzinski & Associates, PC

(57) ABSTRACT

Methods and apparatus for content, media and data delivery and access between devices of a premises and one or more portable media devices. In one embodiment, the apparatus comprises a media bridge between a portable media device (PMD) and a user's home network and/or home devices (e.g., set-top boxes, DVRs, etc.)). The apparatus is adapted to convert content stored on a PMD to a format capable of being rendered on a home device which may then store or playback the content. Control of the presentation is also provided by the bridging apparatus. The apparatus may also be adapted to transfer content from the home device to the PMD for storage or playback. In another embodiment, the apparatus may function within a home network having a trusted domain to provide content between a plurality devices on the network (and in the domain) and the PMD.

37 Claims, 13 Drawing Sheets

(51) Int. Cl.
*H04N 21/258* (2011.01)
*H04N 21/262* (2011.01)
*H04N 21/41* (2011.01)

(56) References Cited

U.S. PATENT DOCUMENTS

| | | |
|---|---|---|
| 5,577,209 A | 11/1996 | Boyle et al. |
| 5,708,961 A | 1/1998 | Hylton et al. |
| 5,715,403 A | 2/1998 | Stefik |
| 5,787,172 A | 7/1998 | Arnold |
| 5,818,438 A | 10/1998 | Howe et al. |
| 5,828,832 A | 10/1998 | Holden et al. |
| 5,870,474 A | 2/1999 | Wasilewski et al. |
| 5,897,635 A | 4/1999 | Torres et al. |
| 5,982,412 A | 11/1999 | Nulty |
| 6,009,103 A | 12/1999 | Woundy |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,181,697 B1 | 1/2001 | Nurenberg et al. |
| 6,212,636 B1 | 4/2001 | Boyle et al. |
| 6,219,710 B1 | 4/2001 | Gray et al. |
| 6,233,341 B1 | 5/2001 | Riggins |
| 6,233,687 B1 | 5/2001 | White |
| 6,256,393 B1 | 7/2001 | Safadi et al. |
| 6,259,701 B1 | 7/2001 | Shur et al. |
| 6,266,421 B1 | 7/2001 | Domyo et al. |
| 6,456,716 B1 | 9/2002 | Arnold |
| 6,519,062 B1 | 2/2003 | Yoo |
| 6,523,696 B1 | 2/2003 | Saito et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,694,145 B2 | 2/2004 | Riikonen et al. |
| 6,742,116 B1 | 5/2004 | Matsui et al. |
| 6,760,768 B2 | 7/2004 | Holden et al. |
| 6,782,550 B1 | 8/2004 | Cao |
| 6,785,810 B1 | 8/2004 | Lirov et al. |
| 6,788,676 B2 | 9/2004 | Partanen et al. |
| 6,807,573 B2 | 10/2004 | Saito et al. |
| 6,813,505 B2 | 11/2004 | Walley et al. |
| 6,859,535 B1 | 2/2005 | Tatebayashi et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,996,544 B2 | 2/2006 | Sellars et al. |
| 7,006,881 B1 | 2/2006 | Hoffberg et al. |
| 7,009,972 B2 | 3/2006 | Maher et al. |
| 7,016,963 B1 | 3/2006 | Judd et al. |
| 7,017,189 B1 | 3/2006 | DeMello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,068,639 B1 | 6/2006 | Varma et al. |
| 7,069,449 B2 | 6/2006 | Weaver et al. |
| 7,072,950 B2 | 7/2006 | Toft |
| 7,073,199 B1 | 7/2006 | Raley |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,149,772 B1 | 12/2006 | Kalavade |
| 7,154,912 B2 | 12/2006 | Chong et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,237,112 B1 | 6/2007 | Ishiguro et al. |
| 7,242,960 B2 | 7/2007 | van Rooyen |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,409,546 B2 | 8/2008 | Platt |
| 7,457,520 B2 | 11/2008 | Rossetti et al. |
| 7,472,280 B2 | 12/2008 | Giobbi |
| 7,486,869 B2 | 2/2009 | Alexander et al. |
| 7,506,367 B1 | 3/2009 | Ishibashi |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,865,440 B2 | 1/2011 | Jaquette |
| 7,925,592 B1 | 4/2011 | Issa et al. |
| 7,954,131 B2 | 5/2011 | Cholas et al. |
| 7,983,418 B2 | 7/2011 | Oyama et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | Lajoie et al. |
| 8,332,370 B2 | 12/2012 | Gattegno et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0066033 A1 | 5/2002 | Dobbins et al. |
| 2002/0077984 A1 | 6/2002 | Ireton |
| 2002/0126654 A1 | 9/2002 | Preston et al. |
| 2002/0129358 A1 | 9/2002 | Buehl et al. |
| 2002/0147771 A1 | 10/2002 | Traversat et al. |
| 2002/0152299 A1 | 10/2002 | Traversat et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0009681 A1 | 1/2003 | Harada et al. |
| 2003/0021421 A1 | 1/2003 | Yokota et al. |
| 2003/0041336 A1 | 2/2003 | Del Sordo et al. |
| 2003/0046560 A1 | 3/2003 | Inomata et al. |

(56) References Cited

U.S. PATENT DOCUMENTS

| | | |
|---|---|---|
| 2003/0048380 A1 | 3/2003 | Tamura |
| 2003/0056217 A1 | 3/2003 | Brooks |
| 2003/0069965 A1 | 4/2003 | Ma et al. |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0115267 A1 | 6/2003 | Hinton et al. |
| 2003/0140227 A1 | 7/2003 | Asano et al. |
| 2003/0163697 A1 | 8/2003 | Pabla et al. |
| 2003/0165241 A1 | 9/2003 | Fransdonk |
| 2003/0166401 A1 | 9/2003 | Combes et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133923 A1 | 7/2004 | Watson et al. |
| 2004/0137918 A1 | 7/2004 | Varonen et al. |
| 2004/0181800 A1 | 9/2004 | Rakib et al. |
| 2004/0193609 A1* | 9/2004 | Phan .................. H04L 12/2803 |
| 2004/0193680 A1 | 9/2004 | Gibbs et al. |
| 2004/0224425 A1 | 11/2004 | Gjerde et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0065888 A1 | 3/2005 | Benaloh |
| 2005/0086683 A1 | 4/2005 | Meyerson |
| 2005/0097006 A1 | 5/2005 | Nyako |
| 2005/0108763 A1 | 5/2005 | Baran et al. |
| 2005/0114900 A1 | 5/2005 | Ladd et al. |
| 2005/0138357 A1 | 6/2005 | Swenson et al. |
| 2005/0169468 A1 | 8/2005 | Fahrny et al. |
| 2005/0172127 A1 | 8/2005 | Hartung et al. |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0278259 A1 | 12/2005 | Gunaseelan et al. |
| 2005/0289618 A1 | 12/2005 | Hardin |
| 2006/0002551 A1 | 1/2006 | Brown et al. |
| 2006/0008256 A1 | 1/2006 | Khedouri et al. |
| 2006/0020786 A1 | 1/2006 | Helms |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0161635 A1 | 7/2006 | Lamkin et al. |
| 2006/0168219 A1 | 7/2006 | Ahluwalia et al. |
| 2006/0179138 A1 | 8/2006 | Van Gassel et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0079381 A1 | 4/2007 | Hartung et al. |
| 2007/0094691 A1 | 4/2007 | Gazdzinski |
| 2007/0098178 A1 | 5/2007 | Raikar |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1* | 9/2007 | Markley et al. .............. 370/401 |
| 2007/0219910 A1 | 9/2007 | Martinez |
| 2007/0220024 A1 | 9/2007 | Putterman et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | LaJoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms |
| 2008/0103976 A1 | 5/2008 | Read et al. |
| 2008/0103977 A1 | 5/2008 | Khosravy et al. |
| 2008/0112405 A1 | 5/2008 | Cholas |
| 2008/0117920 A1* | 5/2008 | Tucker .......................... 370/401 |
| 2008/0123862 A1 | 5/2008 | Rowley |
| 2008/0133551 A1 | 6/2008 | Wensley et al. |
| 2008/0148362 A1 | 6/2008 | Gilder et al. |
| 2008/0155059 A1 | 6/2008 | Hardin et al. |
| 2008/0162353 A1 | 7/2008 | Tom et al. |
| 2008/0165861 A1 | 7/2008 | Whitby-Strevens ............ 361/86 |
| 2008/0177998 A1 | 7/2008 | Apsangi et al. |
| 2008/0212945 A1 | 9/2008 | Khedouri et al. |
| 2008/0222684 A1 | 9/2008 | Mukraj et al. |
| 2008/0235746 A1 | 9/2008 | Peters et al. |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1* | 11/2008 | Vardi et al. .................... 709/223 |
| 2009/0007234 A1 | 1/2009 | Birger et al. |
| 2009/0031371 A1 | 1/2009 | Munsell et al. |
| 2009/0083813 A1 | 3/2009 | Dolce et al. |

(56) References Cited

U.S. PATENT DOCUMENTS

| | | | |
|---|---|---|---|
| 2009/0098861 A1 | 4/2009 | Kalliola et al. | |
| 2009/0100459 A1 | 4/2009 | Riedl et al. | |
| 2009/0102983 A1 | 4/2009 | Malone et al. | |
| 2009/0151006 A1 | 6/2009 | Saeki et al. | |
| 2009/0182815 A1 | 7/2009 | Czechowski, III et al. | |
| 2009/0185576 A1 | 7/2009 | Kisel et al. | |
| 2009/0201917 A1 | 8/2009 | Maes et al. | |
| 2009/0210912 A1 | 8/2009 | Cholas et al. | |
| 2009/0225760 A1 | 9/2009 | Foti | |
| 2009/0265750 A1 | 10/2009 | Jones et al. | |
| 2009/0282241 A1 | 11/2009 | Prafullchandra et al. | |
| 2009/0282449 A1* | 11/2009 | Lee | 725/110 |
| 2009/0292922 A1 | 11/2009 | Park | |
| 2009/0293101 A1 | 11/2009 | Carter et al. | |
| 2010/0030578 A1 | 2/2010 | Siddique et al. | |
| 2010/0031299 A1* | 2/2010 | Harrang et al. | 725/80 |
| 2010/0042478 A1 | 2/2010 | Reisman | |
| 2010/0083329 A1 | 4/2010 | Joyce et al. | |
| 2010/0088236 A1 | 4/2010 | Karabulut et al. | |
| 2010/0088292 A1* | 4/2010 | Tirpak et al. | 707/705 |
| 2010/0106846 A1 | 4/2010 | Noldus et al. | |
| 2010/0131973 A1 | 5/2010 | Dillon et al. | |
| 2010/0138900 A1 | 6/2010 | Peterka et al. | |
| 2010/0169977 A1 | 7/2010 | Dasher et al. | |
| 2010/0185855 A1 | 7/2010 | Margolus et al. | |
| 2010/0198888 A1* | 8/2010 | Blomstedt et al. | 707/827 |
| 2010/0217837 A1 | 8/2010 | Ansari et al. | |
| 2010/0251305 A1 | 9/2010 | Kimble et al. | |
| 2010/0287609 A1 | 11/2010 | Gonzalez et al. | |
| 2010/0313226 A1 | 12/2010 | Cholas et al. | |
| 2011/0071841 A1 | 3/2011 | Fomenko et al. | |
| 2011/0078721 A1* | 3/2011 | Wang et al. | 725/25 |
| 2011/0093900 A1 | 4/2011 | Patel et al. | |
| 2011/0103374 A1 | 5/2011 | Lajoie et al. | |
| 2011/0164753 A1 | 7/2011 | Dubhashi et al. | |
| 2011/0169977 A1 | 7/2011 | Masuda | |
| 2011/0213688 A1 | 9/2011 | Santos et al. | |
| 2011/0219229 A1 | 9/2011 | Cholas et al. | |
| 2012/0008786 A1 | 1/2012 | Cronk et al. | |
| 2012/0011567 A1 | 1/2012 | Cronk et al. | |
| 2012/0167173 A1 | 6/2012 | Nadalin et al. | |
| 2012/0291062 A1 | 11/2012 | Pearson et al. | |
| 2014/0281489 A1 | 9/2014 | Peterka et al. | |
| 2014/0283137 A1 | 9/2014 | Rebaud et al. | |

FOREIGN PATENT DOCUMENTS

| | | |
|---|---|---|
| GB | 2381709 | 5/2003 |
| JP | H08263440 A | 10/1996 |
| JP | 2000156676 A | 6/2000 |
| JP | 2000332746 A | 11/2000 |
| JP | 2001-243707 | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | A-2005-519365 | 6/2005 |
| JP | A-2005-519501 | 6/2005 |
| JP | A-2005-339093 | 12/2005 |
| JP | 2006-185473 | 7/2006 |
| JP | A-2006-311267 | 11/2006 |
| JP | A-2007-020144 | 1/2007 |
| JP | 2008-021293 | 1/2008 |
| JP | A-2008-5047 | 1/2008 |
| JP | A-2008-015936 | 1/2008 |
| JP | 2008507905 A | 3/2008 |
| JP | 2008-167018 | 7/2008 |
| JP | 2008186272 A | 8/2008 |
| JP | A-2008-206039 | 9/2008 |
| JP | 2009-515238 | 4/2009 |
| JP | A-2009-71786 | 4/2009 |
| JP | 2009-176060 | 8/2009 |
| JP | A-2009-211632 | 9/2009 |
| JP | A-2010-502109 | 1/2010 |
| JP | A-2010-079902 | 4/2010 |
| JP | A-2012-505436 | 3/2012 |
| JP | A-2012-523614 | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO02/080556 | 10/2002 |
| WO | WO03/038704 | 5/2003 |
| WO | WO-03087799 A1 | 10/2003 |
| WO | WO-03093944 A2 | 11/2003 |
| WO | WO-2004027622 A2 | 4/2004 |
| WO | WO2005/015422 | 2/2005 |
| WO | WO-2006020141 A2 | 2/2006 |
| WO | WO-2008080556 A1 | 7/2008 |
| WO | WO2009/020476 | 2/2009 |
| WO | WO2012/021245 | 2/2012 |

OTHER PUBLICATIONS

5C Digital Transmission Content Protection White Paper, Hitachi, Ltd., et al., dated Jul. 14, 1998, 15 pages.

A Flexible Content Protection System for Media-on-Demand, by Jian Zhang, at al., ISM China Research Lab, Proceedings of the IEEE Fourth International Symposium on Multimedia Software Engineering (MSE'02), 6_pages.

Cantor S., et al., "Bindings for the Oasis Security Assertion Markup Language (SAML) ," V2.0. Oasis Standard, Mar. 2005, Document ID saml-bindings-2.0-os.

DCAS Authorized Service Domain, Version 1.2, dated Nov. 30, 2005, 54 pages.

DCAS Licensed Specification Abstracts, CableLabs Confidential Information, Jan. 12, 2006, 4 pages.

Digital Video Broadcasting (DVB); DVB SimulCrypt; Part 1: "Head-end architecture and synchronization" Technical Specification—ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

High-bandwidth Digital Content Protection System, Revision 1.091, dated Apr. 22, 2003, Digital Content Protection LLC Draft, 78 pages.

Media Server; 1 Device Template Version 1.01 Jun. 25, 2002.

Office Action mailed Jun. 9, 2015 for Japanese Application No. 20120515064 filed Jun. 8, 2010, 5 pages.

OpenCable Application platform specification OCAP Extension—OACP Home Networking Extension 0C-SP-OCAP-HNEXT-103-080418, 2005-2008.

OpenCable Specification Home Networking 2.0 0C-Sp-HNP2.0 101-08418, 2007.

Primergy BX300 Switch Blade user's manual, Fujitsu Corp., Sep. 30, 2002, first edition, pp. 1 to 20.

RealSystem Media Commerce Suite Technical White Paper, .Copyrgt, 2001 RealNetworks, Inc., 16 pages, http://www.realnetworks.com.

Security Assertion Markup language (SAML) Specification (Version 2.0 released in 2005), as SAML Core: S Cantor et al. Assertions

(56) References Cited

OTHER PUBLICATIONS and Protocols for the OASIS Security Assertion Markup Language (SAML) V2.0. Oasis Standard, Mar. 2005. Document ID saml-core-2 .0-os.(http://docs.oasis-open.org/securit /saml/v2.0/saml-core-2.0-os.pdf).

Van Moffaret, et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/securit/saml/v2.0/saml-core-2.0-os.pdf).

Marusic, et al., "Share it!—Content Transfer in Home-to-Home Networks." IEEE MELECON 2004, May 12-15, 2004, Dubrovnik, Croatia.

OpenCable Application Platform Specification, OCAP 2.0 Profile, OC-SP-OCAP2.0-I01-020419, Apr. 19, 2002.

OpenCable Host Device, Core Functional Requirements, OC-SP-HOST-CFR-113-030707, Jul. 7, 2003.

OpenCable, HOST-POD Interface Specification, OC-SP-HOSTPOD-1F-113-030707, Jul. 7, 2003.

Real System Media Commerce Suite (Technical White Paper), at http://docs.real.com/docs/drm/DRM.sub-WP1.pdf, 12 pages, Nov. 2001.

\* cited by examiner

MEDIA BRIDGE APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data management over a network. More particularly, the present invention is related in one exemplary aspect to apparatus and methods for providing programming content and/or data to a CPE via a substantially centralized media bridge in which is capable of communication with a portable media device.

2. Description of Related Technology

Recent advances in digital information processing and technology have made a whole range of services and functions available for delivery to consumers at their premises for very reasonable prices or subscription fees. These services and functions include digital content or programming (movies, etc.), digital video-on-demand (VOD), personal video recorder (PVR) and networked PVR (nPVR), Internet Protocol television (IPTV), digital media playback and recording, as well high speed Internet access and IP-based telephony (e.g., VoIP). Other services available to network users include access to, and recording of, digital music (e.g., MP3 files), as well local area networking (including wireline and wireless local area networks) for distributing these services throughout the user's premises, and beyond. Currently, many of these services are provided and delivered to the user via a wide variety of different equipment environments including, inter alia, cable modems, Wi-Fi™ hubs, Ethernet hubs, gateways, switches and routers, computers, servers, cable or satellite networks and associated set-top boxes, and PSTNs.

Recent advances in consumer electronics have also led to the widespread introduction of a variety of portable media devices (PMDs) such as, inter alia, portable digital music devices such as the well known Apple iPod™ and other so-called "MP3 players", cellular telephones/smart phones, handheld computers, and personal digital assistants (PDA) which allow users to store and playback audio and video files. Various digital audio and video formats are utilized by PMDs. For example, MP3 players store a number of digitized audio files in the form of MP3 files which are then made accessible to the user. Additionally, the services associated with such technology are typically provided by multiple vendors including e.g., a cable service provider (MSO), cellular service provider (CSP), wireless service provider (WSP), VoIP service provider, music download service, Internet service provider (ISP), PSTN telephone service, etc.

The myriad of services, equipment, data formats and providers can easily create confusion for a user, as often the equipment or services may not interoperate with one another, thus reducing the overall utility provided to the user, and increasing their frustration level.

Accordingly, playback of audio and video files from a PMD is often limited to playback via the device itself. In other words, a user may only select audio and video files from a PMD to be played back to the user via the device. Thus, if a user stores video content, the user is limited to viewing the content on a display associated with the PMD. Although, certain apparatus have been recently developed to extend the playback functionality of audio and video files on a PMD, these apparatus fail to provide a user with the ability to convert audio and video files stored on a PMD into a format suitable for playback on a second apparatus. Likewise, current apparatus fail to provide users with the ability to move content stored on a device associated with a second device to a PMD while also obeying any restrictions on copying or distributing the content.

Furthermore, content conditional access (CA) paradigms currently in use are quite restricted, and not generally extensible beyond the user's cable or satellite set-top box. So, for example, the user would be prohibited from transferring streamed or downloaded content to their Wi-Fi enabled laptop or PC, since proper conditional access support (e.g., that associated with their host cable or satellite network) does not exist in these devices.

Therefore, improved apparatus and methods for distributing digital services between a user premises and PMD are needed. Such improved apparatus and services would ideally provide users with the ability to access and playback content, as well as optionally control the PMD, from a second user device. For example, the user or subscriber would be provided with a conversion apparatus wherein media (whether personal in nature, data files, protected video content, or otherwise) from a PMD in communication therewith would be easily and transparently available to a second user device and subsequently any other media devices in communication with the second user device, subject to any authentication or other content protection or distribution restrictions.

Such unified access would also ideally allow for remote, centralized management and configuration, as well as ability to receive content from the user's premises devices at the PMD.

SUMMARY OF THE INVENTION

The present invention addresses the foregoing needs by disclosing, inter alia, apparatus and methods for managing programming content and data via a substantially centralized apparatus capable of communication with a PMD.

In a first aspect of the invention, apparatus adapted to distribute media content within a network is disclosed. In one embodiment, the apparatus comprises: a first interface adapted to communicate with a first device, the first device capable of outputting or receiving media content in a first format, a second interface adapted to communicate with a second device, the second device capable of outputting or receiving media content in a second format, at least one converter apparatus adapted to convert media content between the first format and the second format, and at least one translator apparatus adapted to translate one or more commands for controlling the manipulation of the media content between a first protocol utilized by the first device and a second protocol utilized by the second device.

In one variant, the media content comprises digitally compressed video content. In another variant, the apparatus further comprises an IEEE Std. 802.3af PoE compliant power distribution apparatus adapted to provide power at least to the first device.

In yet another variant, the first device comprises a portable media device (PMD), the first format comprises an analog format, the second device comprises a customer premises equipment (CPE), and the second format comprises a digital format. The PMD may comprise at least one of: a video player application, cellular telephony interface, or a music player application. The first interface may be adapted to receive media content from the first device in analog format, the converter apparatus may be adapted to convert the media content from the analog format to a digital format, and the second interface may be adapted to transmit the digital format media content to the second device. The first interface may comprise at least one of a composite output interface or a stereo output interface, and the second interface may comprise an Ethernet interface. The second device may further be associated with a premises network comprising a plurality of devices, the media content in the second format being made available to the plurality of devices via the second device. The second interface may be further adapted to receive from the second device one or more commands for controlling playback of the media content according to the first protocol, the first interface may be further adapted to transmit the commands according to the second protocol and may comprise a USB interface or a RS232 or an Ethernet interface.

In another variant, the first and second formats comprise first and second digital encodings, and the converter comprises a processor having a transcoding algorithm adapted to transcode one of the first and second formats to the second and first formats, respectively. In yet another variant, the second device is further associated with a premises network comprising a plurality of devices storing a plurality of media content thereon, individual ones of said plurality of media content being in the first format and received at the apparatus via the second device.

In a second embodiment, the apparatus comprises: a processor; an analog output interface in communication with a portable media device (PMD), the analog output interface adapted to at least receive analog content from the PMD; an network interface in communication with a premises device, the network interface adapted to deliver digital content to the premises device; and at least one converter apparatus adapted to convert the analog content received from the PMD to digital content for transmission to the premises device.

In one variant the network interface is further adapted to receive digital content from the premises device, the converter is further adapted to convert the digital content received from the premises device into analog content for transmission to the PMD, and the analog output interface is further adapted to deliver analog content to the PMD.

In another variant, the network interface is further adapted to receive one or more commands according to a first protocol, the commands being utilized to control playback of the delivered content, the processor is further adapted to transcode the commands from the first protocol to a second protocol utilized by the PMD, and the apparatus further comprises an interface for controlling the PMD using the second protocol.

In a second aspect of the invention, a system for the distribution of media content is disclosed. In one embodiment, the system comprises: a first device associated with a content distribution network and adapted to utilize the media content in a first format; a second device adapted to utilize the media content in a second format; and a bridging apparatus. The bridging apparatus is adapted to: convert the media content between the first and second formats; and deliver the media content from one of the first or second devices to the other of the first or second devices in a format capable of being received thereon.

In one variant, the first device comprises consumer premises equipment (CPE), and the media content comprises content received from a content source within the content distribution network to which the CPE is in communication. The CPE may comprise a coaxial cable interface to exchange the media content with other CPE within a premises served by a local network formed at least in part by the coaxial cable.

In another variant, the second device comprises a portable media device (PMD), and the media content comprises digitally compressed content stored thereon. In yet another variant, the bridging apparatus further comprises a storage entity adapted to store the media content from at least one of the first and second devices, and the act of delivering the content comprises delivery from the storage entity.

In another variant, the bridging apparatus is further adapted to enable the first device to utilize one or more trick mode operations in playback of the media content from the second device.

In a third aspect of the invention, a method of distributing content within a premises network via a bridge is disclosed. In one embodiment, the method comprises: establishing communication with a first device at the bridge; accessing a list of content elements associated with the first device; creating a local directory structure comprising a plurality of records relating to the content elements; making the local directory structure accessible to a second device in communication with the bridge, the second device selecting at least one of the plurality of records; retrieving one of the content elements corresponding to the selected one of the plurality of records; converting the retrieved content element into a format suitable for transmission to the second device; and transmitting the converted content element to the second device.

In one variant, communication with the first device comprises communication via a first interface, and communication with the second device comprises communication via a second and different interface.

In another variant, the content elements associated with the first device comprises content stored thereon. In yet another variant, the content elements associated with the first device comprises content stored on a third device in communication with the first device.

In another variant, the act of converting the content element comprises determining at least one content format type that the second device is capable of both receiving and utilizing. The act of determining may comprise receiving a profile comprising one or more compatible formats from the second device.

In yet another variant, the local entity comprises a database configured to contain a plurality of links, the links enabling the bridge to retrieve the content elements corresponding with the records. The bridge may further comprise a web server process, and the local directory structure may further comprises a web page established by the web server.

In another variant, the content element comprises an associated security data, the security data being used authenticate at least one of the first and second devices to the bridge before the content element can be rendered or recorded by the first or said second device.

In a fourth aspect of the invention, a method of controlling playback of media content is disclosed. In one embodiment, the content is disposed on a first device, and the control is effectuated according to one or more commands received from a second device, and the method comprises: providing media content to the first device from the second device via at least a content bridge; receiving at the content bridge the one or more commands from the first device, the one or more commands being associated with one or more actions for controlling the use of the media content, the first device transmitting the one or more commands in a first protocol; translating the one or more commands from the first protocol to a second protocol, the second protocol comprising at least a protocol utilized by the second device; and transmitting the translated one or more commands to the second device, the second device executing the one or more actions.

In one variant, the first device comprises a cable or satellite network customer premises equipment (CPE), the first protocol comprises Universal Plug and Play (UPnP) protocol, the second devices comprises a portable media device (PMD), and the second protocol comprises a serialized accessory protocol.

In another variant, the commands are received via an Ethernet interface, and the translated commands are transmitted to the second device via an RS232 interface, and/or a USB interface.

In yet another variant, the first device comprises a portable media device (PMD), the first protocol comprises a serialized accessory protocol, the second device comprises a customer premises equipment (CPE), and the second protocol comprises Universal Plug and Play (UPnP) protocol. The act of receiving the commands may comprise receiving at least one of a 30-pin connector interface, and the act of transmitting the translated commands to the second device comprises transmitting via a MoCA or Ethernet interface.

In a fifth aspect of the invention, a method of doing business in a content distribution network is disclosed. In one embodiment, the method comprises: providing a subscriber with an interface to the network over which content can be received; providing the subscriber with apparatus configured to bridge between the interface and a media device; delivering content to the subscriber via the interface as part of a subscription plan; storing content on the interface or a device in data communication therewith; and transferring at least a portion of the stored content to the media device via the apparatus.

In one variant, the method further comprises determining one or more restrictions associated with the media device with respect to the recorded content and enforcing the restrictions as part of the act of transferring.

In another variant, the method further comprises controlling the operation of the media device via a user interface associated with the interface.

In a sixth aspect of the invention, a software architecture is disclosed. In one embodiment, the architecture comprises: a first process disposed at a control area of a content distribution network; and a second process disposed on a media bridge apparatus within a premises served by the network. The first and second processes are in communication, thereby allowing a variety of functions including for example: (i) control of the media bridge by the first process; (ii) reconfiguration and update of the bridge by the first process; and (iii) download of conditional access data or packages to the media bridge.

In a seventh aspect of the invention, computer-readable apparatus is disclosed. In one embodiment, the apparatus comprises a storage medium comprising at least one computer program which, when executed, operates a media bridge apparatus within a premises network so as to, inter alia, allow media content to be transferred between two different device environments (and optionally security domains).

These and other aspects of the invention shall become apparent when considered in light of the disclosure provided herein.

DETAILED DESCRIPTION OF THE INVENTION

Figure 1:
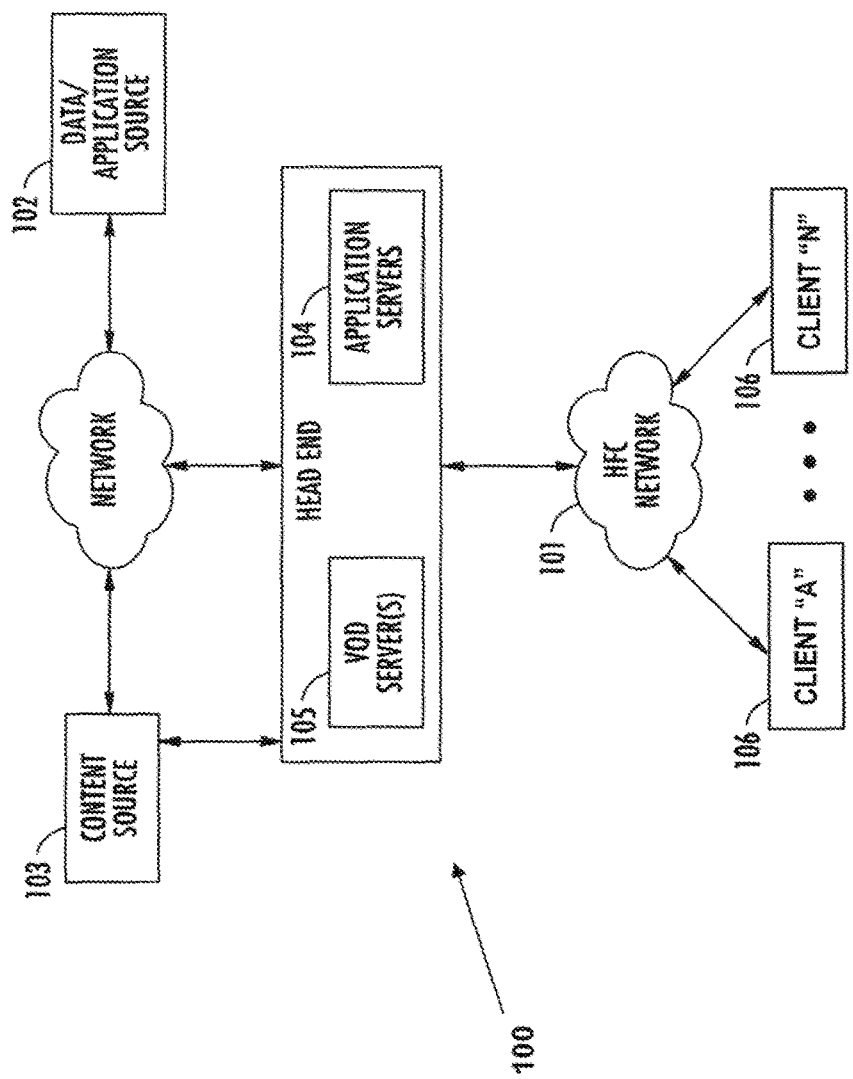
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices, such as for example an iPod™, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), or IrDA families.

As used herein, the terms "personal media device" and "PMD" refer to, without limitation, any device, whether portable or otherwise, capable of storing and/or rendering media.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, Wi-MAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention comprises a media bridging apparatus that, inter alia, acts as a connection between a portable media device (PMD) and a user's home network. This bridging apparatus may be used, for example, to convert content stored on the PMD to a format capable of being presented on a user's set-top box or other client device. Control of the presentation is also provided by the bridging apparatus. In one embodiment, the apparatus enables a user to access and control playback of media from a PMD via a user interface associated with a television, personal computer or other user device. The apparatus may also enable content stored on the PMD to be copied and stored on a user's digital video recorder (DVR) or other storage apparatus, optionally while maintaining appropriate copyright and digital rights management (DRM) requirements associated with the content being manipulated.

The media bridging apparatus can also work within a premises network or trusted domain for media content, thereby allowing a subscriber total mobility in the premises network. For example, media content from the PMD may be accessed via extant networks for distribution to any STB, PC, mobile device, or other PMD.

The media bridging device may also utilize the existing premises network (including a network defined by coaxial cable in the premises, such as a MoCA-enabled network) to allow devices and DVRs to share media content with the PMD.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multimedia specific operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Network—

FIG. 1 illustrates a typical content-based network configuration with which the unified network apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of the "unified" CPE of the invention are described subsequently herein with respect to FIGS. 2 and 3.

Figure 1A:
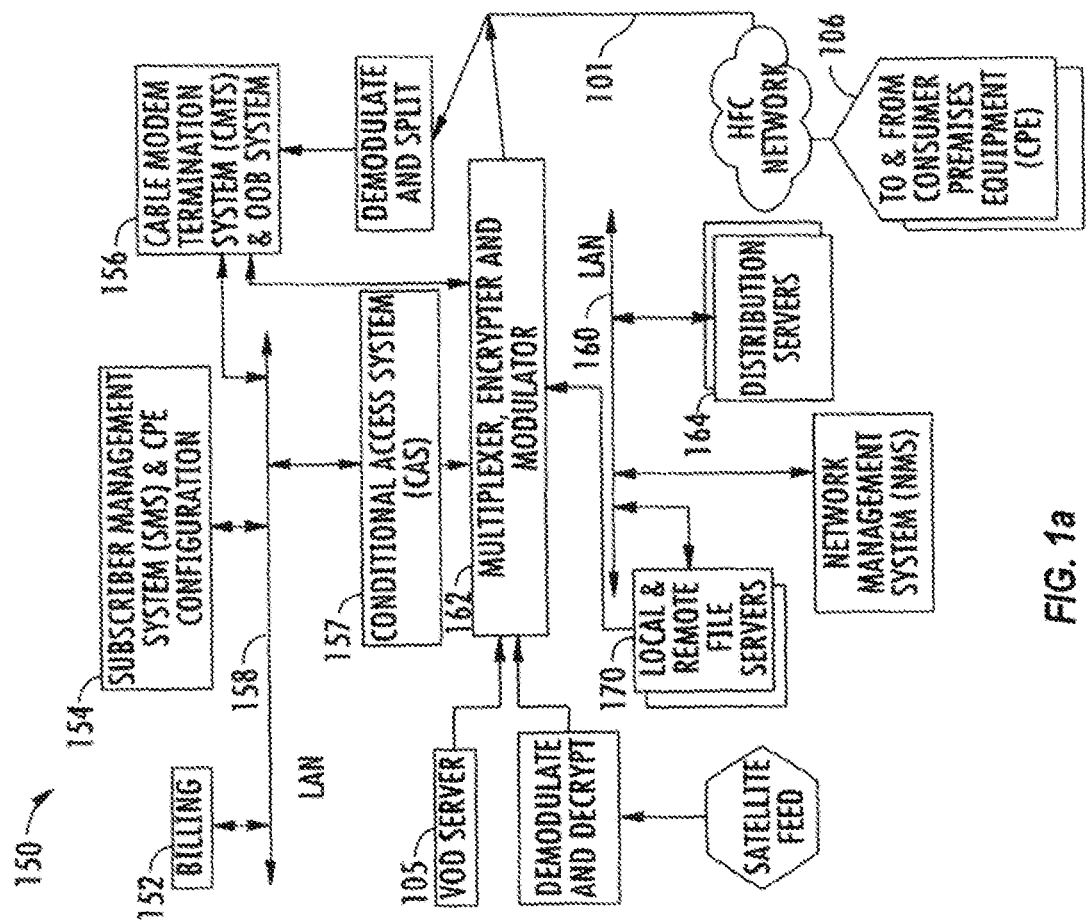
FIG. 1*a* is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
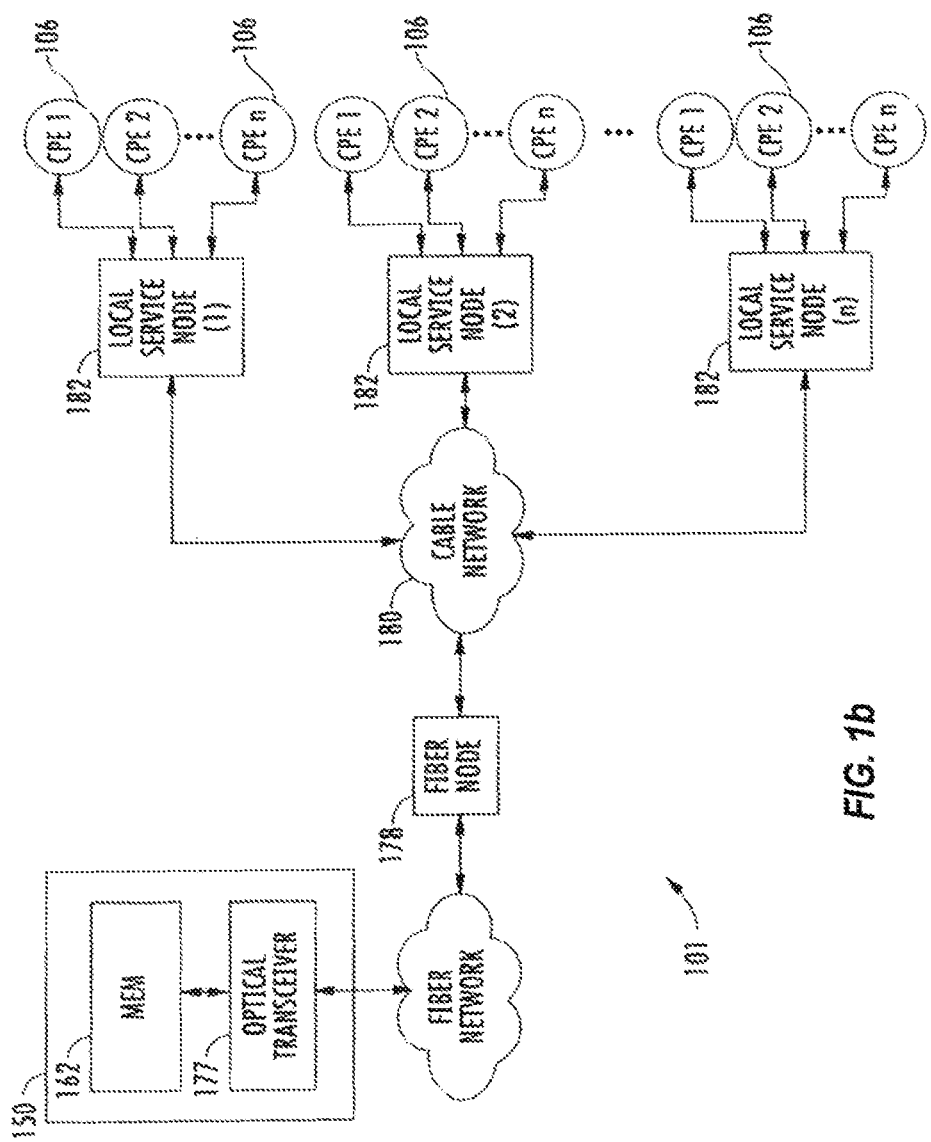
FIG. 1*b* is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Media Bridging Network—

Figure 2:
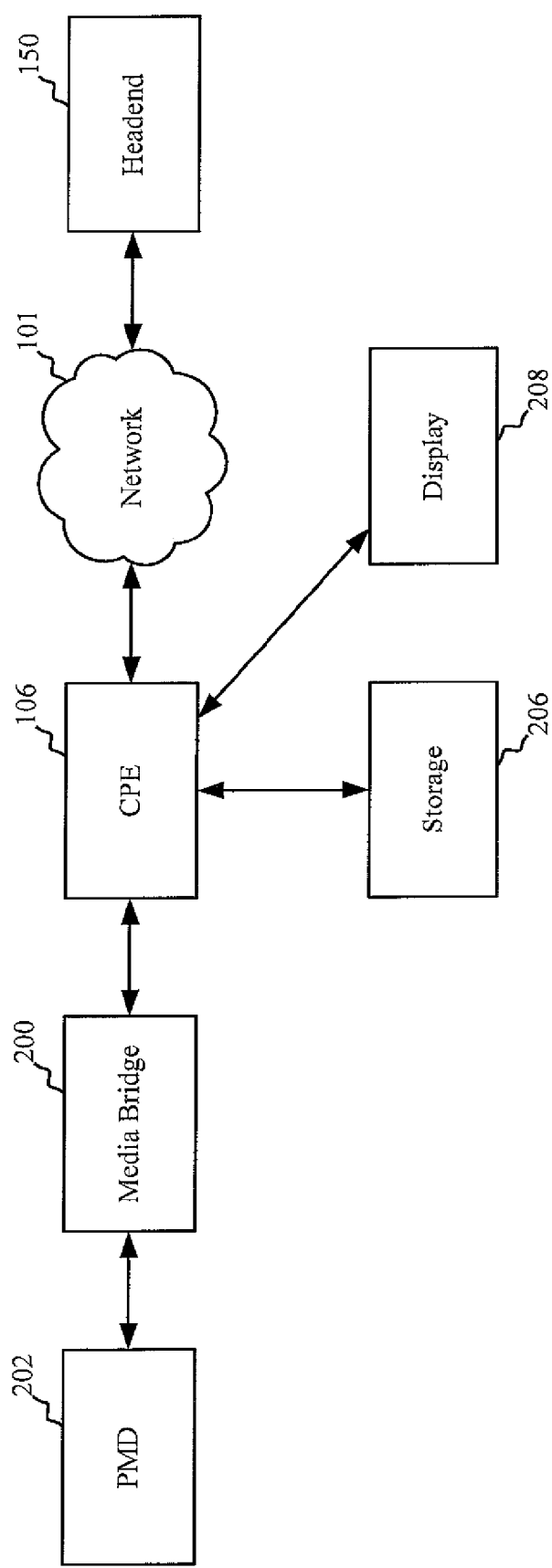
FIG. 2 is a functional block diagram of a content and data distribution network configured in accordance with one embodiment of the invention.

FIG. 2 is a block diagram of a premises network and associated elements configured in accordance with one embodiment of the invention. As illustrated, a PMD 202 and CPE 106 are each coupled to the media content bridge 200 of the present invention. Communication between the CPE 106 and the media bridge 200 is via an Ethernet/GBE network compliant with IEEE Std. 802.3, although any number of other network protocols and topologies could be used such as for example Wi-Fi (IEEE Std. 802.11), PAN (e.g., IEEE Std. 802.15), FireWire (IEEE Std. 1394), etc.

The CPE 106 is further coupled to the head-end 150 in the illustrated embodiment via the distribution network 101 (as discussed above). The CPE 106 is also in communication via a wired or wireless interface (e.g., cabling, PAN or UWB micro-net, etc.) with a storage device 206 and display device 208. As will be discussed in greater detail below, the exemplary CPE 106 may further be in signal communication with any number of different devices including, e.g., a Wi-Fi or other wireless-enabled laptop, a PC, other storage entities, other CPE, etc. Moreover, a "premises LAN" (PLAN) may be created, which may include for example the network formed over the installed coaxial cabling in the premises, a Wi-Fi network, and so forth.

In one variant, the storage device 206 includes a writeable optical drive for writing media files to removable optical disks. So-called "CompactFlash™" or other media such as for example a flash-based USB key or the like, may also be received within the storage device 206 (or a connected reader/writer), so that e.g., music files, digital camera image data, etc. can be readily moved from device to device (or from network environment to other network environment).

In another variant, a personal video encoder (PVE) or comparable device is used as part of or is in communication with the CPE 106 (or an associated client device coupled thereto). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network.

The CPE 106 provides the capability to transmit/deliver a plurality of SD and HD video formats including, without limitation, MPEG-1, MPEG-2, MPEG-4, AVC/H.264, WMV, VC-1, AVI and Real. The CPE 106 also is capable of transmitting/delivering a plurality of audio formats including e.g., MPEG-2 Audio, AC-3, AAC+, MP3, Real and WMA. A plurality of photo or image formats are also supported, including e.g., Graphic Image File (GIF), Joint Photographic Experts Group (JPEG), Bitmap (BMP) and Tag Image File Format (TIFF). The CPE 106 can also signal real-time streaming services that are available via the cable modem (e.g., DOCSIS) tuner resources, or an out-of-band (OOB) channel.

The CPE 106 is not required to contain a decoder for decoding audio/video/media; however, it will be recognized that such decoder capability (as well as transcoding, e.g. decoding in a first format and then encoding in a second format) and/or transrating capability (i.e., processing so as to change bitrate, or establish a constant bitrate output) can be implemented within the CPE 106 if desired.

In one exemplary embodiment, the CPE 106 is compliant with OpenCable™ Home Networking Architecture as disclosed in OpenCable™ Specification Home Networking Protocol 2.0 (OC-SP-HNP1.0-I01-080418 dated Apr. 18, 2008), which is incorporated herein by reference in its entirety. As discussed in the Networking Protocol 2.0 specification, a compliant CPE 106 includes, inter alia, compatibility with the Digital Living Network Alliance (DLNA) requirements such as DLNA version 1.0 or the later version thereof. This capability allows, among other things, rendering of content in DLNA 1.5 format, and generating a content directory using DLNA, as described in greater detail below.

The PMD 202 of FIG. 2 may comprise any portable/personal device, such as portable music players (e.g., MP3 players, iPods™, etc.), portable video players, cameras, video recorders, smart phones, etc., which are coupled to the CPE 106 via any number of different interfaces. Music and other media files are transmitted to the CPE for use and viewing thereon via the media bridge 200. Accordingly, the media bridge is adapted to both physically and logically interface with the PMD 202. The present invention also contemplates the use of different types of physical/logical interfaces, including a substantially universal and converged interface (such as USB 2.0, USSB 3.0, etc.), or alternatively, a plurality of discrete interfaces capable of receiving analog video and audio from the PMD.

The CPE 106 exchanges digital signals with each of the devices it is in communication with, including the media bridge 200. However, the PMD 202 is, in many instances, adapted to output analog signals. Thus, the media bridge 200 acts as a "converter" of sorts, converting from the analog output of the PMD 202 to the digital signals displayed to user via the CPE 106.

In one embodiment, the media bridge 200 utilizes a Universal Plug and Play (UPNP) AV media server to allow content such as music, videos and photos to be delivered to UPnP media rendering/recording devices in the home (CPE 106). Universal Plug and Play (UPnP) AV media server requirements are described in detail in, inter alia, MediaServer:1 Device Template Version 1.01, dated Jun. 25, 2002 which is incorporated herein by reference in its entirety; see also "UPnP™ Device Architecture" Version 1.0, dated Jun. 8, 2000, also incorporated herein by reference in its entirety. Content delivered to UPnP rendering and decoding devices may optionally comprise personal or other media content which does not require rights management (e.g., Digital Rights Management (DRM)) or copy-protection.

Alternatively, "protected" or DRM content can be delivered with the appropriate security package to a rendering device that can receive and authenticate the security package. In one variant, no rendering or recording device is permitted to render or record protected content without proper authentication to the media bridge 200 (i.e., to assure that the UPnP or similar device is in fact authorized to receive the content). In another variant, the rendering device can be configured to authenticate the source of the content (i.e., will only render or record content from an authenticated source). For example, the apparatus and methods described in co-owned U.S. patent application Ser. No. 11/080,693 entitled "Method and apparatus for network content download and recording", filed Mar. 14, 2005, and issued as U.S. Pat. No. 8,028,322 on Sep. 27, 2011, incorporated herein by reference in its entirety can be used to provide such functionality, although other approaches may be used as well.

Media Bridge Apparatus—

Figure 3:
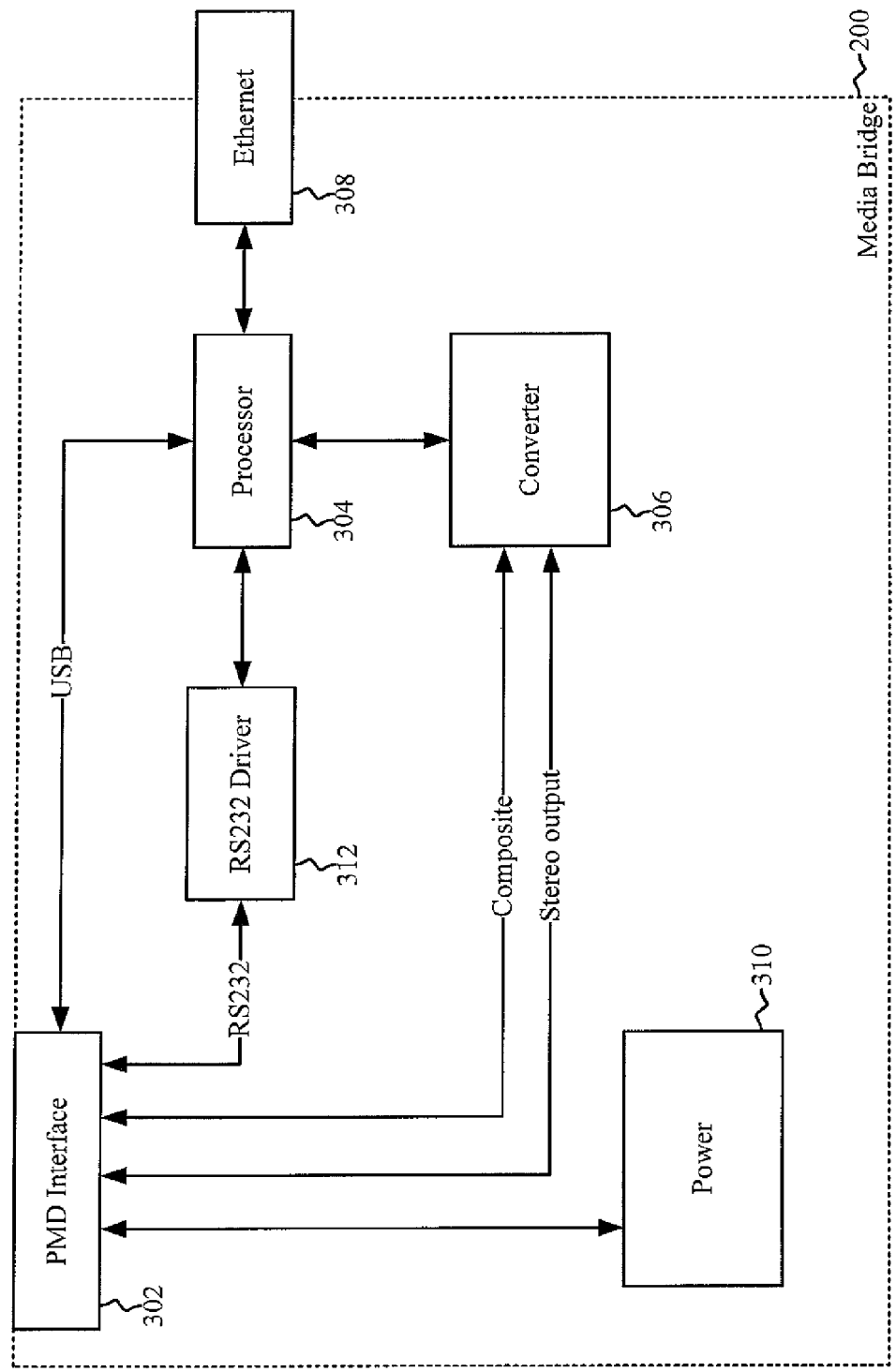
FIG. 3 is a functional block diagram of an exemplary media bridge apparatus configured in accordance with one embodiment of the invention.

FIG. 3 is a block diagram of one embodiment of the media bridging apparatus 200 shown in FIG. 2. The media bridge 200 provides a bridging function to render the content stored on a PMD 202, and is adapted to control the playback and "trick mode" (e.g., FF, REW, Pause, etc.) functions of playback of content stored on a PMD 202 via receipt of the analog signals at the PMD interface 302 and processing at the processing subsystem 304.

As illustrated, the exemplary media bridge 200 of FIG. 3 includes a first interface 302 for connection to a PMD 202, a processing subsystem 304, a converter 306 and an output (e.g., Ethernet or 1394) interface 308. The media bridge 200 further comprises an RS232 driver and a power source or distributor 310, although other connector schemes (e.g., 7 pin, 30-pin, etc.) and drivers may be used for the PMD interface. Each of the components of the media bridge 200 will be discussed in greater detail below.

In one embodiment, the power distributor 310 is an IEEE Std. 802.3af PoE compliant apparatus (e.g., functioning as power sourcing equipment (PSE) or even a power device (PD) in some cases, depending on role of the bridge 200 and the interfaces in use). See IEEE Std. 802.3af (IEEE Std. 802.3-2005 entitled "formation technology Telecommunications and information exchange between systems—Local and metropolitan area networks—Specific requirements—Part 3: Carrier Sense Multiple Access with Collision Detection (CSMA/CD) access method and physical layer specifications"), which is incorporated herein by reference in its entirety. In another embodiment, the power distributor 310 is a Universal Serial Bus (USB)—compliant power supply. Other power distribution apparatus may also be utilized consistent with the present invention.

In yet another embodiment, the media bridge 200 may additionally comprise a storage entity (not shown) such as a random access memory (RAM), a hard disk drive, an optical drive (e.g., CD-ROM or DVD), NAND flash memory, or some combination thereof.

As indicated previously, the PMD 202 will typically have analog outputs built into the system. Thus, audio and video data may be output as an analog signal to another device via a stereo audio port and/or a composite port. Accordingly, the media bridge 200 includes a stereo audio input port and/or a composite port. The stereo audio port illustrated in FIG. 3 allows music and video audio to be received from the PMD 202. The video input port allows video (e.g., in the form of composite video signals) to be retrieved from the PMD 202.

In another variant, the PMD 202 is configured to output digital data, and hence the bridge 200 includes a suitable digital interface for receiving such data. Suitable interfaces include for example USB, Wi-Fi, FireWire, or any number of other adapted for digital data transfer and signaling.

Some PMDs 202 also provide a controlling interface through RS232 and/or USB. Thus, the media bridge 200 of the present invention comprises a PMD interface 302 capable of controlling the PMD 202 via an RS232 and/or USB port (e.g., USB host/slave arrangement). The USB port may also be utilized to provide content to the PMD 202, as will be discussed below. The RS232 port is adapted to receive and transmit serial binary data or control signals from the PMD 202. The media bridge further comprises an RS232 driver 212 which allows the processing subsystem to communicate with the PMD 202. The RS232 port enables the media bridge to control the PMD 202, also discussed in greater detail below.

The ability of the media bridge 200 to receive signals received via other ports or interfaces (e.g., wireless, high-speed serial data ports, etc.) is also appreciated given the present disclosure, and hence the media bridge 200 is in no way limited to the interface components presented in FIG. 3 provided below.

The processing unit 304 and data converter 306 convert and process content received via the PMD interface (analog outputs) into a format that can be rendered by remote equipment (such as a users' CPE, STB, or other device). In one embodiment, a "flash" A/D converter of the type well known in the electronic arts is used for analog-to-digital conversion, although it will be appreciated that other approaches may be used with equal success. Moreover, as described below, the converter 306 may also include D/A capability if desired.

The processing subsystem 304 performs a variety of functions including control of the PMD 202. In the exemplary embodiment, the processing subsystem 304 is runs software which directly or indirectly controls the PMD 202 via the signal interface between the devices. As will be discussed in greater detail below, the processing subsystem 304 may be further adapted to operate the output interface (e.g., Ethernet or 1394) protocol stack, and to provide parameters to the data converter, or otherwise control the data converter. Software running on the processing subsystem 304 may also operate the RS232 stack as disclosed below. Further, the processing subsystem 304 can perform USB device discovery/detection, control and bulk data transfer, as well as to perform security (e.g., authentication) protocols.

In the exemplary embodiment, the converter 306 performs analog-to-digital conversions. In yet another embodiment, the converter 306 may further perform analog to digital conversions as well or in the alternative, such as where the received media is rendered in an analog form, and is transmitted to the PMD 202 in digital format. The converter 306 may also receive and implement one or more parameters from the processing subsystem 304. The converter 306 is may further receive and transmit composite and stereo signals from PMD 202, as well as generate from the analog signals digital content (such as e.g., MP3, MP4, AAC, etc.). Software running on the converter 306 further enables the converter 306 to output a content stream to the processing subsystem 304 for transfer via the output interface 308.

The illustrated content bridge 200 can assume literally any form factor, including those adapted for desktop, or free-standing use, or alternatively may be integrated in whole or part (e.g., on a common functional basis) with other devices if desired.

It will be recognized that while a linear or centralized bus architecture is shown as the basis of the exemplary embodiment of FIG. 3, other internal bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the particular media bridge 200 configuration shown in FIG. 3 is for illustrative purposes, and various other configurations of the bridge apparatus 200 are consistent with the invention. For example, media bridge 200 may not include all of the elements shown in FIG. 3, and/or may include additional elements and interfaces such as for example an interface for the HomePlug Av standard which transmits digital data over power lines, specialized networking or security processors, a PAN (e.g., 802.15), Bluetooth, or other short-range wireless interface for localized data communication, a longer range WLAN or Wi-MAX (IEEE Std. 802.16) interface, etc.

The output port 308 of the media bridge 200 in one embodiment comprises a standard 10/100 Base T Ethernet, Gigabit Ethernet (GBE), or a 10-Gig-E port. The bridge device 200 may also utilize more than one of the aforementioned ports and/or interfaces, such as a USE, 1394, S-Video, HDMI, DisplayPort, or other output In accordance with still another embodiment of the invention, the output port 308 or other network interface provides auto-negotiation capabilities (e.g., for connection data rate, and half- or full-duplex). The exemplary interface 308 also provides auto-MDI/MDIX. This automatic MDI/MDI-X feature provides the ability to automatically detect the required cable connection type, and configure the media bridge 200 properly to make use of the indigenous cable type. This feature effectively allows all cables to be connected to the media bridge 200 without any additional modification or external logic. In one embodiment, the bridge apparatus 200 can identify the cable connection type, and adjust its MDI port parameters to the cable by switching between the "twisted" and "straight" pairs of conductors on the cable. The auto switching function is typically accomplished prior to the auto-negotiation algorithm previously described, although other configurations are possible (e.g., a "test-and-then-configure as needed" type approach). The bridge apparatus 200 can also optionally disable auto-negotiation and MDI/MDIX (whether automatically or under user control such as via a GUI interface), and can be manually configured.

In another embodiment, the media bridge 200 includes a display or other user interface element capable of displaying one or more indications, including e.g., a LAN/WAN LED or other indicator, to show circuit activity. A LAN—802.3 LED or other indicator to show link status and/or activity on one or more of the Ethernet ports, as well as a LAN—802.11 LED or indicator to show that the radio interface is enabled, and/or related activity thereon. Other LEDs or indicators may also be provided using any number of schemes readily apparent to those of ordinary skill. Furthermore, a "soft" display (e.g., TFT or LCD display having software generated indications) may be used on the bridge device 200 (or a remote device in communication therewith, such as a wireless remote control) to provide a flexible display environment. Moreover, the methods and apparatus of co-owned U.S. patent application Ser. No. 10/773,664 filed Feb. 6, 2004 entitled "Methods And Apparatus For Display Element Management In An Information Network" and issued as U.S. Pat. No. 9,213,538 on Dec. 15, 2015, incorporated herein by reference in its entirety, may be used within the bridging device 200 or other communicating devices. Specifically, display elements such as GUI windows or discrete indicators in a client device running multiple related or unrelated applications can be managed and controlled. In one embodiment, an improved window management entity is provided within the device with which HAVi-compliant application(s) can interface in order to access display elements according to a priority structure or hierarchy. One or more privileged applications are designated and allowed to affect the priority structure, including requesting a new in-focus application to be placed atop the priority structure. The network operator can also optionally control the operation of the window manager remotely via a network agent.

In one specific example, the media bridge 200 of the present invention may be utilized to provide interconnection between a PMD 202 and a user's set top box (STB). The CPE 106 may render content in Digital Living Networking Alliance (DLNA) standard 1.5 format which is compatible with UPnP A/V. Accordingly, the analog signal from the PMD 202 is formatted and converted to DLNA.

The processing subsystem 304 may also access the PMD 202 and read the content list or other directory structure stored thereon. The processing subsystem 304 is adapted to, via software running thereon, build a content directory (e.g., DLNA CDS) or a web interface, and provide the directory or interface to a CPE 106. From the CPE 106, the processing subsystem 304 receives one or more user actions taken with respect to the content. For example, the user may select one or more content from the PMD 202 for playback, may fast forward or rewind content, may create a playlist, may remove content from the PMD 202, etc. The actions or commands discussed above may be inputted by a user via a remote control, keyboard, key pad, touch screen, speech recognition interface, etc.

The processing subsystem 304 directs retrieval and translation of the selected content in the protocol understood by the PMD 202. For example, where the PMD 202 comprises an MP3 or similar player such as an iPod™, the processing subsystem 304 will convert control functions received from the CPE 106 (such as fast forward, rewind, pause, etc.) into an appropriate protocol (e.g., iPod™ Accessory Serial Protocol). The converter 306 is responsible for encoding or encrypting content received from the PMD 202 (as composite and audio) to a format suitable for transmission to a CPE 106 (e.g., MPEG2/4 over IP). The converter may also be adapted to adjust resolution of video content to 640×480 pixels, 128×960 pixels, etc.

In another embodiment, the content bridge 200 has associated therewith a DVR or other recording and/or storage apparatus, which can be used to backup or store personal content/media files. The media bridge 200 may also be configured to detect newly uploaded content, and/or changes made to stored content, and make this new or upgraded content available to network media rendering devices (e.g., CPE 106). This content "refresh" process can be event or occurrence driven (upon the occurrence of a given event such as receipt of a user-initiated "update" or "refresh" operation), periodically (e.g., every X minutes), when new devices are detected (such as new CPE 106 and/or new PMD 202 are connected via a PHY and logically detected), or according to any number of other different schemes recognized by those of ordinary skill when provided the present disclosure.

The media bridge apparatus may also include a MoCA-compliant IC or chipset, such as the exemplary c.Link® EN 2510 device manufactured by Entropic Communications of San Diego, Calif., so as to facilitate networking of content (such as HD content) over coaxial cabling within the premises, as described in greater detail subsequently herein.

Figure 4:
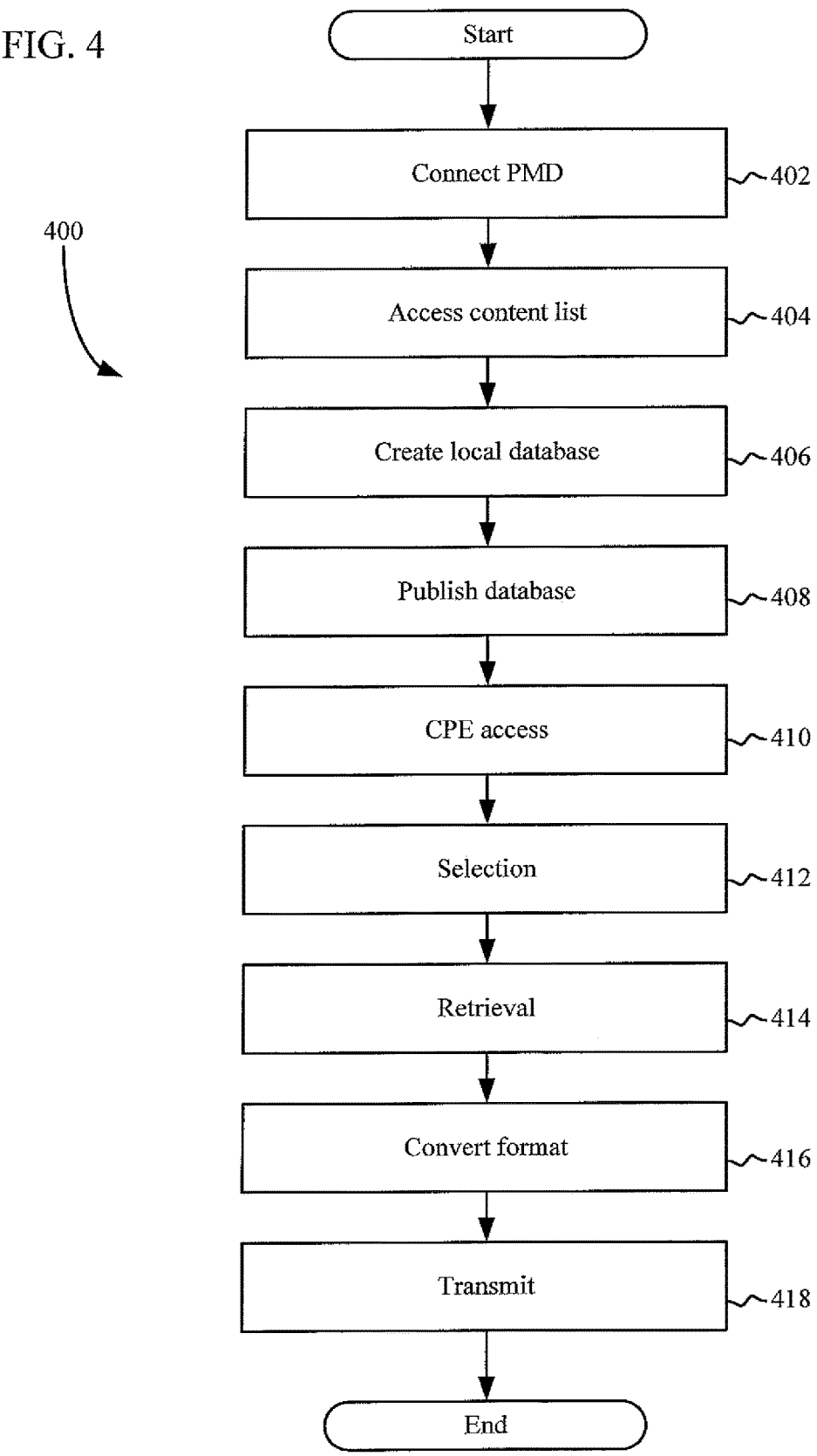
FIG. 4 is a logical flow diagram illustrating one embodiment of the method of providing content from a first device to a second device via the exemplary media bridge apparatus of FIG. 3.

Referring now to FIG. 4, one embodiment of a method 400 of utilizing a media bridge 200 such as that described above, to connect a PMD 202 to a user device, is illustrated and described.

Per step 402, a user connects the PMD 202 to the media bridge apparatus 200. The user may accomplish such connection via the PMD interface 302, which as discussed above, may comprise any one of a plurality of interface types including those for media output and those for control of the PMD 202. For the purposes of illustration in the present example, the PMD 202 interfaces with the media bridge 200 via at least the stereo output and the RS232 connections running an Apple iPod™ Accessory Serial Protocol as illustrated in FIG. 3.

Per step 404, the processing subsystem 304, via the RS232 (or other control interface) connection and RS232 driver 312, accesses a list of content stored on the PMD 202. The media bridge 202 is adapted to, at step 406, read the list and create a database or description of the content stored in the PMD 202. The database, in one embodiment, contains links to the content by storing the media server location and a URL to which that content belongs. The database is then published to a DLNA Content Directory (step 408).

At step 410, a CPE 106 connected to the media bridge 200 via the output port 308 (or via a device which is in communication with the output port 308 and which can interface with the CPE) is permitted access to the Content Directory for the connected PMD 202. Thus, in one embodiment, the media bridge 200 comprises an application containing the UPnP control point and rendering module needed to enable the CPE to browse and display available content resident on the PMD.

Then, per step 412, the user may use a remote control or other user interface/control device associated with the CPE (such as a key pad, touch screen, etc.) to select one or more of the content elements listed in the directory.

The user's selection is received at the processing subsystem 304, which uses the aforementioned content links to retrieve the selected media content at step 414. Retrieval of the selected content comprises in one embodiment sending a properly formatted message to the PMD 202, via the controlling interface (e.g., RS232 running iPod™ Accessory Serial Protocol). The PMD 202 outputs the appropriate selection via a stereo output to the converter 306 of the content bridge 200.

Per step 416, the retrieved content is translated at the converter 306 (e.g., converted from analog to digital, or transcoded/transrated as required in digital variants), and provided to the processing subsystem 304 for transport via the PHY associated with the output interface 308 (e.g., Ethernet, 1394, Wi-Fi, etc.). In one embodiment, transmission uses Hypertext Transfer Protocol (HTTP) or Real-time Transport Protocol and Real-time Streaming Protocol (RTP/RTSP) over the networking interface 308. RTSP allows a user to remotely control the media bridge 200 (a streaming media server), to issue VCR-like commands such as "play" and "pause", and to allow access to files on the PMD 202 via the bridge 200. The processing subsystem may perform other processing functions necessary to affect the playback of the content at the CPE, and, at step 418, transmits the converted and processed media content to the CPE.

Figure 5:
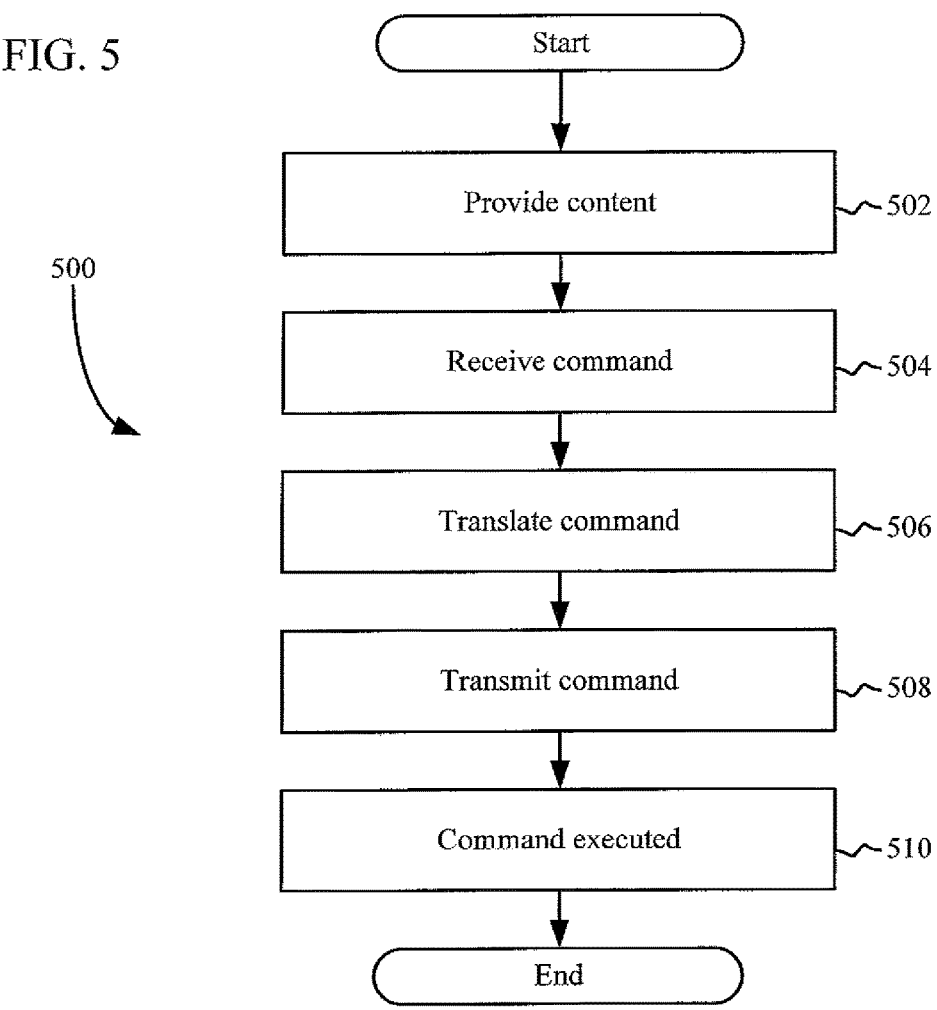
FIG. 5 is logical flow diagram illustrating one embodiment of the method of controlling a first device from a second device via the exemplary media bridge apparatus of FIG. 3.

FIG. 5 is a logical flow diagram illustrating an exemplary method 500 of utilizing a media bridge 200 to control the output of media content from a PMD 202. Per step 502, content is provided from the PMD 202 to a CPE 106 via the media bridge 200. In one embodiment, the content is provided according to the method discussed above with respect to FIG. 4.

At step 504 of the method 500, the media bridge 200 receives at least one command from the user entered at the CPE 106. For example, the command may comprise a fast forward, rewind, pause, etc. command received via a user's remote control, keyboard, keypad, touch screen or other input apparatus. As noted previously, the CPE 106 can be made compliant with OpenCable™ Home Networking Architecture as disclosed in OpenCable™ Specifications Home Networking Protocol 2.0 (OC-SP-HNP1.0-I01-080418; Apr. 18, 2008), incorporated herein by reference in its entirety. Accordingly, commands from the CPE 106 for the playback and trick mode functions of the content are received as UPnp A/V commands (such as play, fast forward, etc.).

Per step 506, the commands (such as the aforementioned UPnP A/V commands) are translated at the processing subsystem 304 to a format understood by the PMD 202. The command is then transmitted (step 508) to the PMD 202 where it is executed (step 510). In one embodiment, the commands received from the CPE 106 are translated into iPod™ Accessory Serial Protocol commands at the processing subsystem 304 and, via the RS232 driver, are transmitted to the PMD 202. It will be appreciated, however, that the media bridge apparatus 200 may be adapted to also translate into other PMD 202 device command protocols over RS232, USB, or other interfaces as well.

Web Server Embodiment—

In another embodiment of the invention, the processing subsystem 304 (or other dedicated processor; not shown) of the media bridge 200 is configured to run a server process (such as an HTTP server process), such as via an HTTP-based or other browser application. The web server can, inter alia, display the list of files included on the mass storage unit 308, including the different media files, pictures, and/or music or data files.

In one embodiment, the web server process running on the processing subsystem 304 accepts requests from a user, such as from a user interface associated with the CPE 106 (e.g., via HTTP or other protocol), or directly via a user interface of the bridge 200, if so configured. The web server process replies to the user requests by sending the requested data content which are encoded for a particular codec or plug-in such as VLC, Windows Media, Real, or QuickTime. As discussed above, the media bridge 200 is adapted in the present embodiment to control the PMD 202 in order to effectuate such delivery of the contents to the requesting entity. In yet another embodiment, the web server may further enable a remote system to view the status of, and optionally configure one or more parameters of, the media bridge 200.

Figure 6:
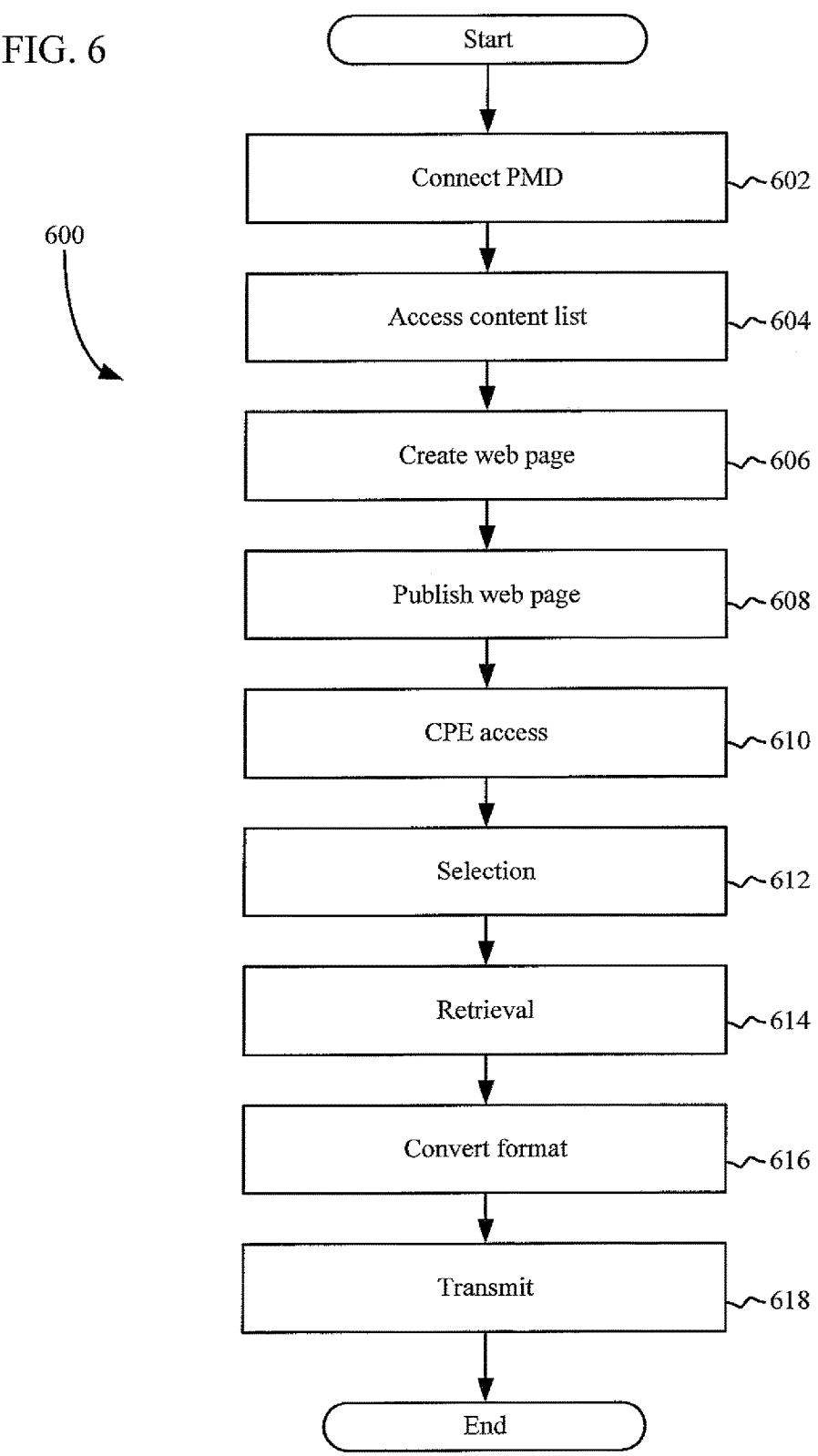
FIG. 6 is a logical flow diagram illustrating one embodiment of the method of providing content from a first device to a second device via a web server associated with the exemplary media bridge apparatus of FIG. 3.

Referring now to FIG. 6, an exemplary method 600 of utilizing a media bridge 200 such as that described above, to connect a PMD 202 to a user device and provide content via a webserver is illustrated.

Per step 602, a user "connects" the PMD 202 to the media bridge apparatus 200 via the PMD interface 302 (e.g., via cable, wireless PHY, or other means). At step 604, the processing subsystem 304, via the RS232 (and driver 312) or other control interface, accesses a list of content stored on the PMD 202. The media bridge 200 includes an application which creates a webpage (e.g., HTML format) of the content stored on the PMD 202 (step 606). The webpage created by the media bridge 200 in one variant has controls and a media player embedded therein. For example, the webpage may include a VLC media player, Windows Media Player, Real player, or a QuickTime player.

The media bridge 202, at step 608, publishes the webpage to the CPE 106 using a markup language such as HyperText Markup Language (HTML), Extensible Markup Language (XML). The CPE 106 in one variant displays a web-based computer application GUI to perform content upload, render and management operations on the CPE 106, and perform other such functions, although other software environments are contemplated as well. This web-based user interface (UI) can be indigenous to the CPE, or delivered to the CPE via the web server process running on the media bridge 200. In one embodiment, the media bridge 200 runs one or more applications adapted to identify whether one or more prerequisites needed to run the user interface (which might include for example the JAVA Runtime Environment, Microsoft.NET™ Framework 1.1, and or other applications) are satisfied. If these required applications are not available on the target CPE (e.g., PC), then the application will prompt the user, and offer to load the prerequisites before loading the aforementioned user interface. Once all prerequisites have been met, the web browser can be launched, with the CPE 106 user interface enabling the user to view the media content of the PMD 202.

The CPE 106 is able to access the webpage, and render the contents of the webpage (including a listing or other representation of the content stored on the PMD 202) to a user at step 610. Per step 612, the user selects one or more of the listed content elements for playback or display. The content is then retrieved from the PMD at step 614, and transmitted to the CPE 106 at step 616. It will be appreciated that the content may be transmitted in its totality from the PMD to the recipient CPE 106 before playback or display on the latter, or alternatively streamed or periodically buffered from the PMD during playback/display of the selected content element(s).

For example, the display or playback of content that is provided to a user may be controlled at the CPE 106. In one exemplary embodiment, commands, such as fast forward, rewind, play, pause, etc., presented on the media player of the webpage are accessible by the CPE 106. When a user at the CPE 106 accesses a command associated with the content, the command is translated to the appropriate command protocol for execution by the PMD 202. For example, the PMD 202 translates HTML actions (buttons for play, fast-forward, rewind, pause, etc.) into the media device play, fwd, rwd, pause commands. Thus, a play button in an HTML web page is translated to the Accessory Serial Protocol play command. The commands may be translated to the aforementioned Accessory Serial Protocol or the literally any protocol that is compatible with the PMDs internal protocols.

The exemplary bridge apparatus 200 may also be adapted to ensure that the CPE 106 used to access the web interface is properly configured with the appropriate software to run the web application. This may include for example the JAVA Runtime Environment and the UPnP control point and media rendering software. If the CPE 106 does not meet these requirements, the web application may attempt to install the needed components on the CPE 106, such as by obtaining them locally (i.e., they may be stored as executables or the like on a mass storage device associated with the media bridge 200 or the CPE itself), or requesting or retrieving them from a network entity (e.g., the head-end 150, or a dedicated or third-party application server 104, or a designated Internet URL or other network address). However, the CPE 106 can also be configured to warn users that additional software is needed, and will be loaded, or give the user the option to cancel the installation or obtain the requisite software independently.

Software Architecture—

Figure 7:
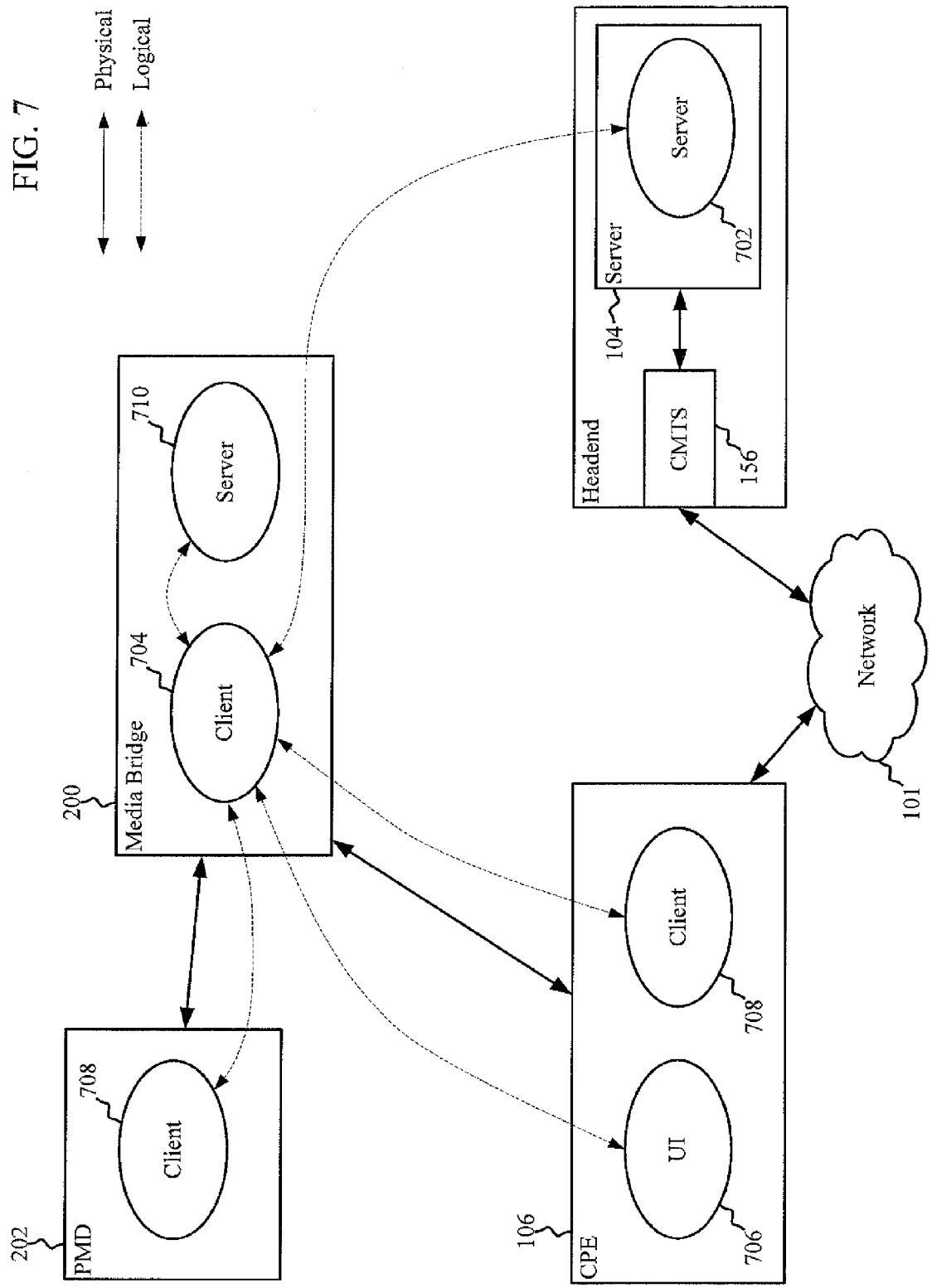
FIG. 7 is graphical representation of one exemplary embodiment of a software architecture useful with the network of FIG. 2.

FIG. 7 illustrates one exemplary embodiment of a software architecture useful with the media bridge 200 and other entities within the network. As shown in FIG. 7, the architecture comprises a configuration "server" process 702, which may be disposed for example at a head-end entity (such as the application server 104) if desired. By disposing the server process 702 at the head-end (or network switching or distribution hub), the server process 702 can advantageously configure and provision multiple bridging apparatus 200 simultaneously.

A corresponding client process 704 is disposed on each bridge apparatus 200; this client process allows the media bridge 200 to receive/send information from/to the server process 702, for e.g., remote configuration and provisioning of the apparatus 200, monitoring of operations, statistics, obtaining status information, updating applications running on the bridge 200, etc.

The client portion 704 may also be in logical communication with other processes within the premises, such as for example the user interface (and configuration) process 706 running on the CPE 106. Client processes 708 on other devices, such as a PMD 202 and CPE 106, can also communicate with the client process 704 of the media bridge 200 in one embodiment.

As previously noted, the media bridge 200 may also include various other processes 710, such as a media server, web or HTTP server, and so forth. These can be used in a stand-alone fashion (e.g., where a PMD 202 in the premises network merely accesses the media server in order to obtain stored personal content from the media bridge apparatus 200), or as a local proxy for other distant servers (such as a remote third party web server, MSO headend server, etc.).

The exemplary embodiment of the media bridge 200 of the invention utilizes a Linux operating system, although it will be appreciated that any number of different operating systems and software environments can be utilized within the apparatus 200. For example, the well-known Sun Microsystems Java environment can be used consistent with one or more functions, as can the Qualcomm "BREW" (binary runtime environment). Myriad different software architectures will be appreciated by those of ordinary skill provided the present disclosure.

During operation of the media bridge 200, software is run on the processing subsystem 304. which controls the operation of the other components of the system, and provides various other functions within the media bridge 200, including control of the PMD 202 via commands input at the CPU 106. In one embodiment, the system software/firmware may also be externally reprogrammed, such as using a download and reprogramming of the contents of the flash memory, replacement of files on the storage device or within other non-volatile storage, etc., thereby allowing for remote reprogramming or reconfiguration of the media bridge 200 by the MSO or other network agent.

Premises Networking—

In yet another embodiment (illustrated at FIG. 8), the media bridge 200 may also create a premises network 800 (such as a Local Area Network (LAN) utilizing the existing coaxial cable in a home). For example, an Ethernet-over-coax based technology allows services to be delivered to other devices in the home utilizing a frequency outside (e.g., above) the traditional cable service delivery frequencies. See also the MoCA (Multimedia over Coax) alliance and MoCA Standard Versions 1.0 and 1.1, which are incorporated herein by reference in their entirety, which describe OFDM-modulated radio frequency signals on the order of 1 GHz delivered over extant coaxial cable systems. Accordingly, one embodiment of the invention uses frequencies on the order of 1150 MHz to deliver data and applications to other devices in the home such as PCs, laptop computers, other PMD, media extenders, and set-top boxes. The coaxial network is merely the PHY or bearer; devices on the network 800 utilize Ethernet or other comparable networking protocols over this bearer to effectuate local area networking.

In one embodiment, the home network 800 is established according to the OpenCable™ Application Platform (OCAP) Specification: OCAP Home Networking Extension protocol (OC-SP-OCAP-HNEXT-I03-080418, dated Apr. 18, 2008), incorporated herein by reference in its entirety. As disclosed therein, content may be shared among a plurality of networked CPE 106, including the media bridge 200 described herein. Accordingly, content from the PM 202 may be shared among all the CPE 106 via an Ethernet-over-coax topology, or another interface of the various CPE 106 and the media bridge 200.

Figure 8:
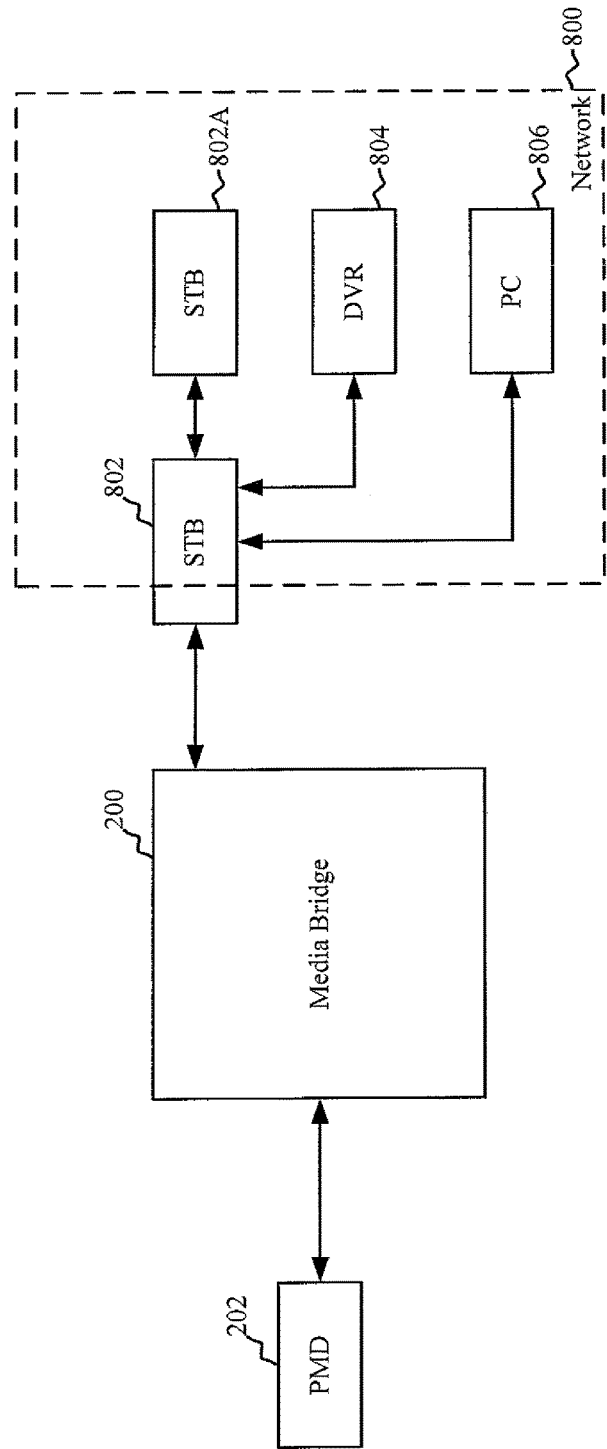
FIG. 8 is a block diagram illustrating one embodiment of a premises (e.g., home) network in accordance with the present invention.

In the illustrated embodiment, the PMD 202 is adapted to share content with at least a PC 806, an STB 802 (e.g., digital set-top box or DSTB), and a DVR 804 via the media bridge 200. FIG. 8 former illustrates that any of the CPE 106 in direct communication with the media bridge 200 may also be in communication with a plurality of other CPE 106 for sharing content thereto (such as, e.g., STB 802a).

As noted previously, content from the PMD 202 may be stored on an internal mass storage device or another connected device (e.g., RAID) of the bridge apparatus 200, or may be transmitted directly from storage within the PMD 202 to the requesting or target device. Content is securely delivered to any viewing location in the premises network 800 that shares a common security model via the various interfaces available, including e.g., Wi-Fi. 1394, and Ethernet. If the content is stored at the bridge apparatus 200, it will be available to the various CPE 106 (such as STB 802, 802a, PC 806 and/or DVR 804) on the network 800 even after the PMD 202 has been disconnected.

In the present invention, the CPE 106 may be configured to include a Multimedia Over Coax Alliance (MoCA) retail compliant F-connector for providing data over coaxial capability. The exemplary MoCA port operates in the 1125-1525 MHz band, although other frequencies (MoCA compliant or otherwise) may be used for this purpose if desired. The MoCA connector may be utilized to distribute content to all CPE 106 connected thereto, or may for communication to only certain CPE 106.

The exemplary MoCA interface, in one embodiment, supports a minimum of 100 Mbps of effective data throughput, at 1364 byte or greater packet size, up to 68 dB of attenuation, and minimum 60 Mbps of effective data throughput at 1364 byte or greater packet size between 68 dB and 80 dB, although other performance capabilities may be used consistent with the invention. The MoCA interface may also support a plurality of (e.g., 8 or more) active nodes on the coaxial network 800.

As is well known to those of ordinary skill in the art, a CPE's 106 MoCA interface can utilize coaxial cabling installed within a home to create an Ethernet or other network 800. Various CPE 106 (including PC 806, STB 802, 802a, and DVR 804), when placed in communication with the network 800, will announce themselves to one another (or otherwise detect the presence of the others). Once connected, the CPE on the network 800 can freely exchange content with one another. The CPE 106 may, in one embodiment, utilize UPnP A/V to access the content listed in other CPE 106 directories. Hence, for example, the PC 806 of FIG. 8 may access the content directory of the DVR 804 if desired, and vice versa.

The exemplary MoCA interface (not shown) of the CPE 106 may be compliant with the MoCA standard v1.0 (September 2005) or v1.1 (May 2007) previously referenced herein. The MoCA interface in this case has a maximum physical layer latency of 5 ms, and its transmitter may not exceed +3 dBm (58.1 dBmV). In one variant, the interface operates over standard 75 Ohm RG-59 and RG-6 coax, and can be selectively disabled if desired.

Figure 8A:
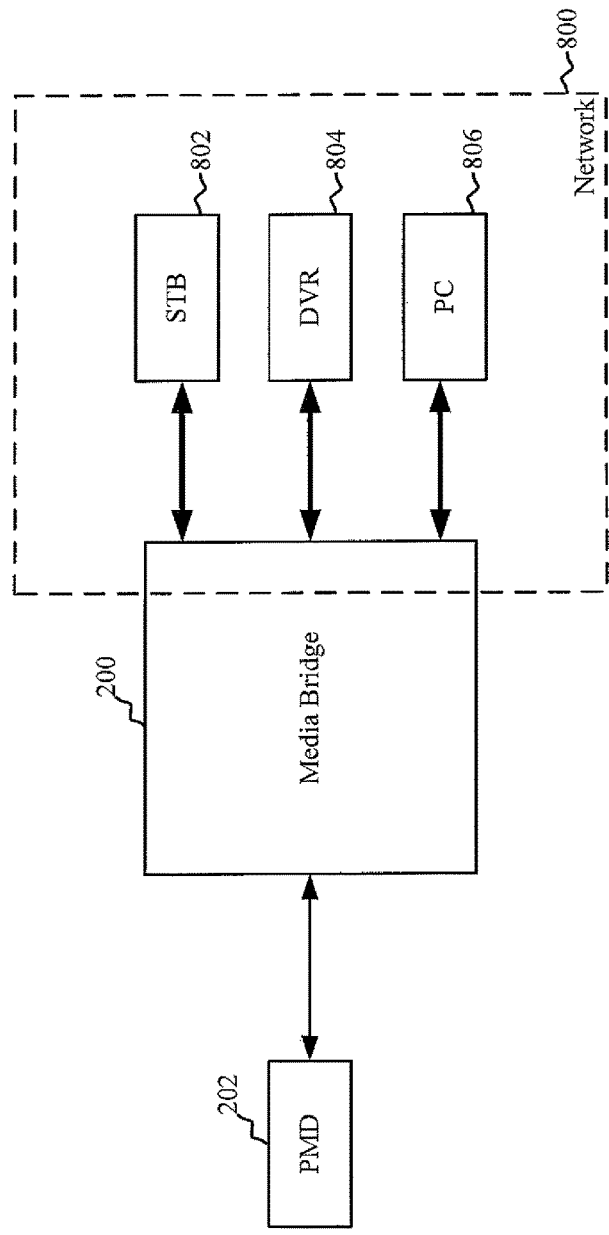
FIG. 8*a* is a block diagram illustrating a second embodiment of a premises network in accordance with the present invention.

In one embodiment, the CPE 106 which comprises the MoCA interface and performs networking functions for the media bridge apparatus 200. Content from a PMD 202 is made available to a first CPE 106 via the bridge apparatus 200; the CPE 106 can then, via the MoCA interface, introduce the content to the home network 800 (such as over the Ethernet topology discussed above). In an alternative embodiment (FIG. 8*a*), MoCA capability is incorporated directly into a media bridge apparatus 200 (such as via the Entropic chipset previously described or other IC).

The exemplary media bridge 200 shown in FIGS. 2 and 3 may also act as a Wi-Fi node or access point (AP), thereby allowing Wi-Fi enabled devices such as smartphones or laptop computers to connect to the premises network 800 and access media content from other devices (e.g., PMD 202) also present on the network 800. It will be recognized, however, that the media bridge 200 may also act as a slave or station (STA) within an ad hoc or other Wi-Fi network, such as where another device on the premises acts as the AP. The media bridge 200 can include this Wi-Fi capability in a dedicated radio suite (e.g., one or more ICs or ASICs), as part of a larger SoC device, as a Wi-Fi card, or even as an external device in data communication with the bridge apparatus 200 or other associated device (e.g., plugged into an external slot or port of the media bridge 200, such as a USB or 1394 interface).

The Wi-Fi interface may further provide Wired Equivalent Privacy (WEP), Wi-Fi Protected Access (WPA) and/or WPA2 encryption services of the type well known in the art on one or more wireless connections. The interface also may support other protocols, such as the Extensible Authentication Protocol (EAP)/802.1x Std. for authentication (e.g., using a RADIUS server or the like). Similarly, the media bridge apparatus 200 can be configured for other types of secure network or tunneling capabilities, such as the Wireless Transport Layer Security (WTLS) layer in a Wireless Application Protocol (WAP) stack (e.g., where the apparatus 200 acts as a WAP gateway or proxy), or virtual private networking (VPN). Media Access Control (MAC)-level filtering may also be utilized.

In one embodiment, the Wi-Fi interface provides service over substantially all of the premises where it is used; however, other schemes for providing additional coverage can be used as well (such as "daisy-chaining" APs together, etc.). The interface's operating channel is set automatically by scanning for a free channel and initializing the access point on that channel.

Accordingly, PC 806, STB 802, 802*a*, and DVR 804 are adapted to, via the media bridge 200: (i) receive content from the hard drive or mass storage associated with the media bridge 200; (ii) receive content directly from a connected PMD 202, and/or (iii) receive content stored at any of the other of PC 806, STB 802, 802*a*, and DVR 804 of the network 800. Thus, video and/or audio content may be played back at various locations throughout the premises. These other locations may be in direct or indirect communication with the bridge apparatus 200; e.g., connected to or communicating with the bridge 200 directly, or communicating via the another CPE 106 (such as STB 802*a* connected via STB 802).

In one embodiment, the media bridge 200 can automatically discover all DLNA-capable clients (e.g., CPE 106) during boot up or other events, and present the available content from the PMD 202 content directory (DLNA CDS) to them. The bridge apparatus 200 may also be adapted to automatically start a DLNA-compatible media server (which has a UPnP Content Directory Service) at boot using only the aforementioned Ethernet, MoCA and/or Wi-Fi network interfaces. The bridge apparatus 200 reads the content directory from the media device (such as e.g., reading all the content over the Accessory Serial Protocol), and builds a local database of that content. The bridge apparatus 200 then publishes the content to its digital media server, in order for any digital media player to see the content. Once specific content is selected by a media player for playback, the bridge apparatus 200 controls the attached media device to playback the content over the audio or video port. The bridge apparatus 200 would then encode/transcode the content and have it flow over UPnP AV as per DLNA to the DMP in a DLNA defined Media Format.

In yet another embodiment, the media bridge 200 may act as a quality-of-service (QOS) policy enforcement point in the premises network 800. For example, the apparatus 200 may receive and honor policy enforcement configuration files from the head-end 150 or other provisioning system. An IEEE Std. 802.1p tag or similar mechanism can be used to identify QOS priority. For example, a "priority 1" tag can be inserted for streaming video, while a "priority 2" tag can be inserted for VoIP data, a tag of "priority 3" for audio-only services, a tag of "priority 4" for all other services, and so forth. Other schemes (which may even be dynamic in nature based on, e.g., user preferences, management entity provisioning, etc.) may also be used consistent with the invention. The bridge apparatus 200 can configure the MoCA, Ethernet and other relevant interfaces to recognize and utilize the data of these defined priorities in the proper or specified order. For instance, in one variant, the user can specify which of the different media types/delivery paradigms is most important, or rank them, such that user experience is optimized when receiving appropriately encoded or tagged data.

The media bridge apparatus 200 may further provide a mechanism to identify new CPE 106 on the network 800, and grant or deny content from a PMD 202 thereto based on, e.g. conditional access privileges or business rules. This may or may not extend to the directory service on the PMD; i.e., a CPE may be able to view the PMD directory contents or listing, but not access the actual content or media files or transfer/copy them.

In another embodiment, the media bridge 200 has associated therewith a DVR or other recording and/or storage apparatus which can be used to backup or store personal content, media, or data files. This device may be external to the bridge 200, or incorporated within the form factor thereof (including for example removable media). The media bridge 200 may also be configured to detect newly uploaded content, and/or changes made to stored content, and make this new or upgraded content available to network media rendering devices (e.g., CPE 106). This content "refresh" process can be event- or occurrence-driven (e.g., upon the occurrence of a given event such as receipt of a user-initiated "update" or "refresh" operation), invoked periodically (e.g., every X minutes), when new devices are detected (such as new CPE 106 and/or new PMD 202), or according to any number of other different schemes.

It is further appreciated that other options may be available to a user, such as inter alia, creating a playlist of content. In other words, the media bridge 200 may comprise necessary storage and functionality to allow a user to select (via e.g., a user interface in communication with the user's CPE 106, or of the bridge 200 itself) several of the content elements available on the PMD 202 for playback in a particular order, at a particular time, or according to a particular scheme (e.g., randomized, according to genre, artist, etc.). Other functions such as allowing a user to sort through content on the PMD 202 by artist, genre, etc. may also be provided.

In yet another embodiment, data may be stored at a storage entity associated with the CPE 106 (e.g., DVR, or other mass data storage unit), or even on a client device or network agent in communication with the CPE 106, for later use by a user. For example, MP3 music content from a connected PMD 202 may be retrieved via the PMD or bridge 200 and "pushed" via the media bridge to the CPE 106, wherein the MP3 music is stored on the mass storage device (e.g., HDD) associated therewith. Similarly, video data from a connected PMD 202 might be retrieved and, via the media bridge 202, streamed from the PMD 202 to the CPE 106 for storage thereon (or distribution via yet another interface, such as via an Ethernet, 1394, or other interface to the user's connected PC or via Wi-Fi interface to their laptop). Myriad different movements (e.g., push or pull of files, streaming, etc.) of myriad different types of data (video, audio, data or application files, etc.), can be accomplished using the media bridge 200, and herein lies one of its salient advantages; i.e., the ability to act as a substantially universal "hub" for moving (and transcoding, transrating, encrypting/decrypting, compressing, formatting, etc.) data between various different hardware and software environments.

Content Provisioning—

In yet another embodiment of the invention, the media bridge 200 is adapted to provide media content to a PMD 202 from the various CPE 106 in communication therewith. The media bridge 200 advantageously leverages the extant ability of the PMD 202 to receive content from an external source to allow the PMD to ingest content from CPE 106 (e.g., DVRs or other such devices) in the home via the previously described Ethernet-over-coaxial or other interface of the bridge 200.

The media bridge 200 interfaces to the CPE 106 via the network (e.g., Ethernet) interface 308. In the exemplary embodiment, the bridge apparatus 200 implements all protocols required to access content on the CPE 106, including implementation of Digital Transmission Content Protection (DTCP) over Internet Protocol (IP) link protection. The bridge apparatus 200 receives a stream of content from the CPE 106 (e.g., from a mass storage device thereof), and transcodes the content into a format understood by the PMD 202. The present invention may be utilized with various types of PMD 202, thus the bridge 200 must be adapted to convert the content into various content formats including, inter alia, AVC, H.264, MPEG2, etc. In one embodiment, content is received from the sourcing CPE 106 in MPEG2 or MPEG4 encoded format, and translated to a format suitable for the PMD 202 if required (e.g., to AVC or H.264, Windows Media Player, Real, etc.). The bitstream may also be transrated if required (e.g., for streaming media).

Figure 9:
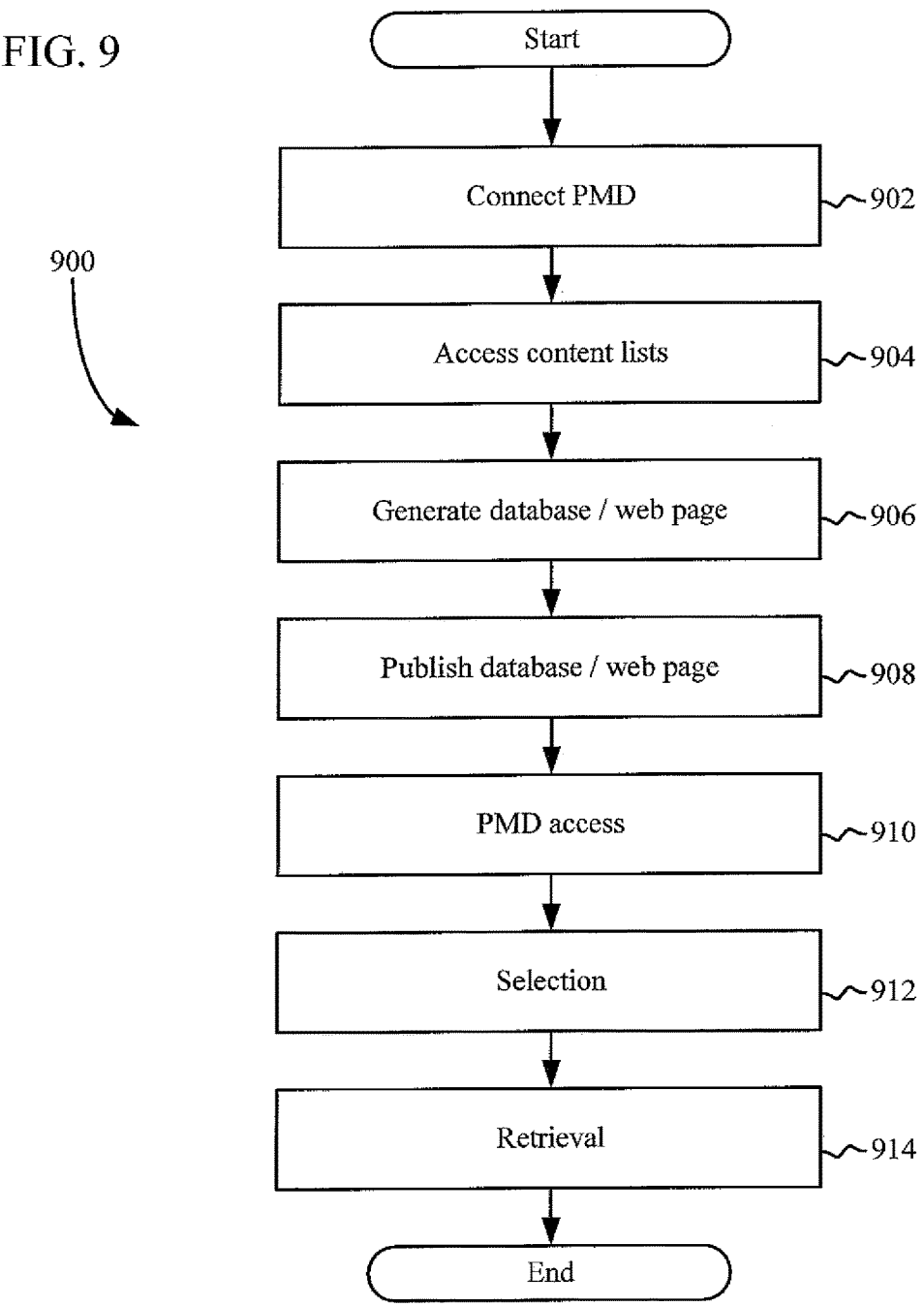
FIG. 9 is a logical flow diagram illustrating a second embodiment of the method of providing content from a first device to a second device via the exemplary media bridge apparatus of FIG. 3.

One embodiment of the exemplary method 900 for content provisioning of the present invention is given in FIG. 9. As illustrated, per step 902, a PMD 202 is first "connected" to the media bridge apparatus 200 (such connection which may be wired or wireless in nature, depending on the interface between the PMD and bridge being utilized). Upon connection, the bridging apparatus 200 determines the type of PMD 202 connected (via the aforementioned methods), and immediately notes the content format(s) that the PMD 202 is capable of receiving. In order to determine the formats a PMD 202 is capable of receiving, the bridge apparatus 200 builds a media player database including capability information. It is further appreciated that a UPnP device may advertise its player capabilities including resolution and video decoding capabilities. In this instance, the bridge apparatus 200 can easily determine which transcoder to use for each targeted device.

Per step 904, the bridge 200 accesses content lists from each (or a subset) of the CPE 106 connected thereto, including those connected indirectly via the premises network 800. The bridge 200 uses information in the content lists to create a database (or webpage) of the contents (step 906). In one embodiment, the processing subsystem 304 on the bridge may be adapted to review the contents of the various CPE 106 for duplicates, and ensure that the database (or webpage) is not redundant. The processing subsystem 304 may be further adapted to sort the database by content type (e.g., music content, video content, data content etc.) or other parameter(s) so as to provide an abbreviated or particularly configured list to the PMD user.

It is further appreciated that the web server of the media bridge 200 (where present) may be accessed from a remote device (e.g., a PC with Internet or other connectivity to the web server process of the bridge) in order for a user of that remote device to view the contents of the CPE 106 connected thereto (including the contents of several CPE 106 in a premises network 800). A user at the remote device may then select individual ones of the content elements, and direct the media bridge 200 to "download" that content to a PMD 202 connected thereto.

The media bridge 200 may further be adapted to discover CPE 106 within the premises network 800 via the Ethernet-over-coax or similar capabilities previously discussed. The bridge 200 may then generate a resource map table including tuners, disk drives and status, to be used when creating the aforementioned database (or webpage), and ingesting content from (and streaming content to) the PMD 202.

At step 908, the PMD 202 accesses the database (or webpage) and at step 910, selects one or more content items therefrom. Per step 912, the selected content is retrieved by the media bridge.

Figure 9A:
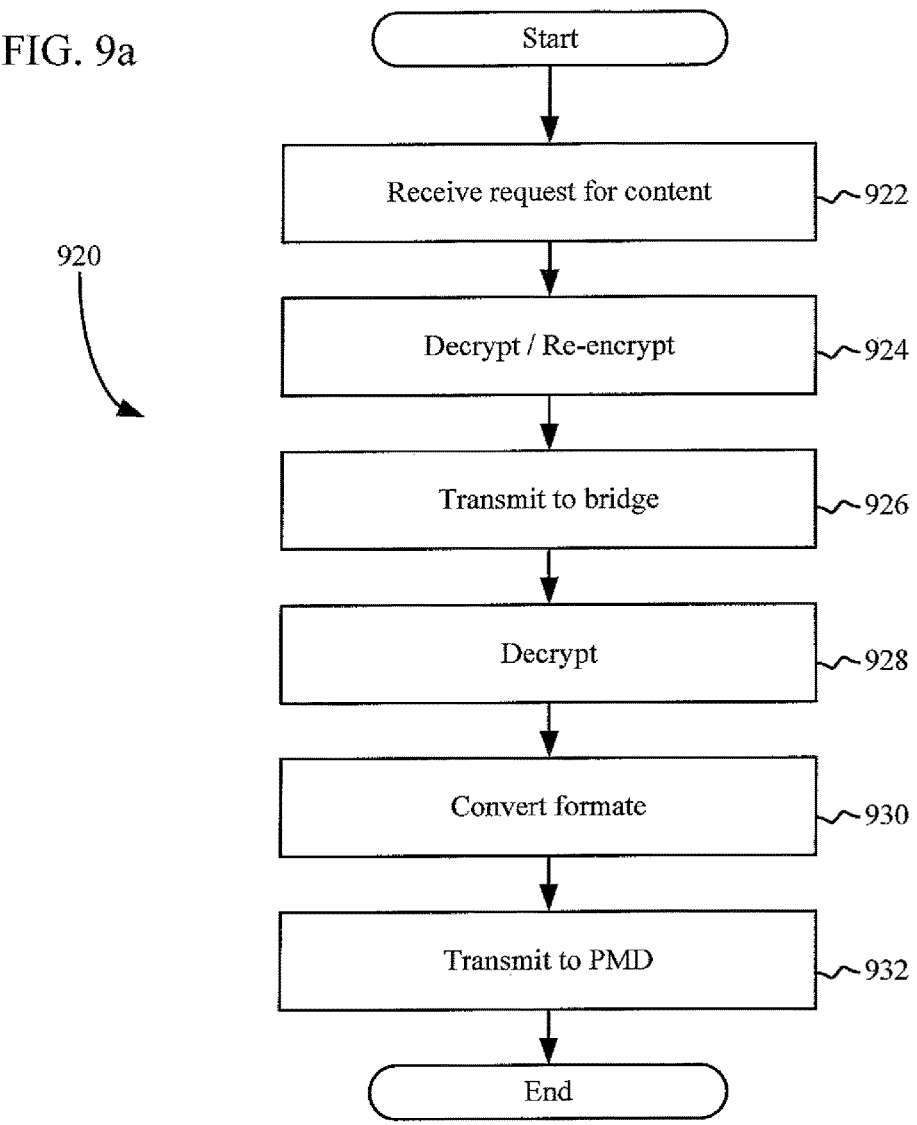
FIG. 9*a* is a logical flow diagram illustrating one embodiment of the method of converting content from a first format to a second format compatible with a receiving device utilizing the media bridge apparatus of FIG. 3.

FIG. 9a illustrates an exemplary embodiment of the method 920 by which content is retrieved from the CPE 106 by the bridge 200 and provided to a PMD 202. Media content arrives at the CPE 106 from the cable or satellite head-end 150 encrypted according to an MSO Conditional Access (CA) scheme such as Powerkey, etc. The CPE 106 decrypts the CA protected content, and re-encrypts the content with a Proprietary Content Protection (PCP) scheme (i.e., manufacturer encryption) for recordation and playback on the CPE 106. Per step 922, processing subsystem 304 of the media bridge 200 requests the downloaded and recorded content from the CPE 106 via the network interface 308. Alternatively, the CPE 106 storing the recorded content may comprise a CPE 106 not directly connected to the media bridge 200 (such as STB 802a of FIG. 8). In this instance, the content is requested from the media bridge 200 across the premises network 800.

Upon receipt of the request the CPE 106 then, per step 924, decrypts the content encrypted using the PCP encryption scheme, and re-encrypts the decrypted content with an approved OpenCable™ Home Network Content Protection (OCCP) or other desired format.

At step 926, the OCCP (re)encrypted content is then transmitted to the media bridge apparatus 200. The bridge 200 decrypts the content at step 928. The media bridge 200 is adapted to read and respect the copy protection data of the content (e.g., protection bits as indicated in the DTCP over IP copy protection field as set forth in the OpenCable™ Specification—Home Networking Security Specification (OC-SP-HN-SEC-D01-081027 dated Oct. 27, 2008, incorporated herein by reference in its entirety)). In other words, the illustrated embodiment of the media bridge 200 determines whether the content may merely be played back on the PMD 202, or whether it may be stored thereon (recorded, e.g., only if the copy protection of the content is marked as "copyfreely" or "copy one generation").

At step 930, the media bridge 200 converts the content to a format suitable for transmission and storage on the PMD 202 (if required). As discussed above, the apparatus 200 has previously determined the type of PMD 202 connected (or at least its capabilities with respect to media), and thus makes a decision regarding the suitable format based on the PMD 202 type. For example, where the PMD 202 comprises an MP3 player, content is converted from MPEG 2/4 (received from the CPE 106) to MPEG 1 Audio Layer 3 (MP3) for playback and/or storage on the PMD 202. Lastly, per step 932, the converted content is sent to the PMD 202 for playback and/or storage.

In yet another embodiment, the media bridge 200 is configured to store a plurality of PMD profiles therein. In one variant, one or more profiles are placed therein at the time of manufacture. Alternatively, the processing subsystem 304 may download a device profile from the PMD 202 when it is connected thereto. The profile contains information related to the media formats operable on the device. For example, when a user connects a Zune device to the media bridge 200, the device may indicate to the media bridge 200 that it may only receive content rendered in Windows Media format. The media bridge 200 then uses the profile to determine translation/transcoding of content to be sent to the PMD 202. The bridge can also learn from the various devices it is connected to; i.e., collect device-specific profiles and assemble a library or database of such profiles for future use. For instance, one embodiment of the bridge is configured to remember specific user PMD or device profiles (e.g., Joe's iPod), and utilize these profiles subsequent to first acquiring them, in order to determine media encoding/transrating/security requirements and permissions. Alternatively, platform-specific and user-generic profiles or templates (e.g., an iPod, irrespective of ownership or specific configuration) can be used by the bridge 200.

The media bridge 200 may further be adapted to enable the PMD 202 to control the playback of content received from the CPE 106. That is to say, in instances where content is merely played back or streamed (and not fixedly stored on the PMD 202), the PMD 202 user may input one or more commands with respect to the content playback which are executed by the CPE 106 via the media bridge 200. The method by which the CPE 106 is controlled is similar to the method of FIG. 5 for controlling the PMD 202 by the CPE 106 via the bridge 200. Specifically, one or more commands relating to the playback (e.g., pause, fast forward, rewind, etc.) are received at the media bridge 200 from the PMD 202. In one exemplary embodiment, the PMD 202 comprises an iPod™, and the CPE 106 comprises a digital set-top box or DVR; commands are received at the bridge apparatus 200 in the aforementioned Accessory Serial Protocol, and translated by the bridge to UPnP commands. The translated commands are then transmitted to the CPE 106 (which is adapted to receive and execute UPnP commands), and executed thereon to effectuate the desired function. Alternatively, where the control protocols used by the PDM and the sourcing CPE are compatible, the PMD commands can simply be passed through the bridge 200 to the CPE directly for execution thereby.

Trusted Domain—

It will further be recognized that the present invention can be used in conjunction with a so-called "trusted domain" for content and other data protection if desired. Exemplary trusted domain apparatus (and methods) are described in co-owned U.S. patent application Ser. No. 11/006,404 filed Dec. 7, 2004, entitled "Technique For Securely Communicating Programming Content" and issued as U.S. Pat. No. 8,312,267 on Nov. 13, 2012, as well as co-owned U.S. patent application Ser. No. 10/894,884 filed on Jul. 20, 2004 entitled "Technique For Securely Communicating And Storing Programming Material In A Trusted Domain" and issued as U.S. Pat. No. 8,266,429 on Sep. 11, 2012, each of the foregoing being incorporated herein by reference in its entirety, although other approaches may be used consistent with the present invention. These applications disclose, inter alia, a multi-layered rights arrangement to prevent unauthorized use and transfer of protected content, especially in a premises network 800. For example, the network 800 may be considered to comprise multiple layers. One such layer may be a "trusted domain," described in aforementioned U.S. application Ser. No. 10/894,884. For example, in a cable TV system, the trusted domain might include not only the system portion where programming content traditionally is secured by (and within total control of) a cable operator, including, e.g., the head-end, delivery network, etc., but also user devices, e.g., DSTBs or other CPE, at subscribers' premises which are capable of receiving and securely storing programming content in a prescribed manner. The cable operator can control certain subscriber access and usage with respect to content held within the trusted domain. For example, movie content held within a cable operator's trusted domain (e.g., on a hard drive of an STB or CPE) cannot be distributed over the Internet in viewable form, and cannot become a source for duplication of multiple viewable copies.

A second layer of the network may be defined as being outside the trusted domain. A device in the second layer is assigned an indicator indicating an extent of security of the device. For example, when the device in the second layer requests transfer of protected content from a device in the first layer, the first layer device authenticates the second layer device to determine legitimacy of the device for receiving the protected content. After the second layer device is authenticated, the first layer device transfers not only the protected content, but also a set of rules associated with the protected content. At least some of the rules in the set are associated with the indicator and applicable to the second layer device with respect to use of the protected content.

The foregoing disclosures broadly encompass the concept of the multi-layered rights arrangement including the trusted domain for preventing unauthorized use of protected content. It will therefore be appreciated that the present invention is not limited to use of specific devices in the arrangement. For example, the invention may also apply to a host device connected to a CableCARD module, jointly realizing the functionalities of a DVR STB or CPE. In one implementation, a CPE 106 has programming content, which is encrypted, stored in storage therein. The media bridge 200 receives a request from the PMD 202 for accessing the programming content. The request includes a data package stored in association with the encrypted programming content in the storage. In response to the request, the media bridge 202 determines that the PMD 202 is allowed to access the programming content based on information (e.g., usage rights information) in the first data package. The bridge 202 may then provide the CPE 106 at least data concerning a cryptographic element (e.g., an encryption key) for decrypting the encrypted programming content in the storage, thereby providing the PMD 202 with access to the programming content.

So-called "DCAS" systems (downloadable conditional access systems) may also be used consistent with the invention in order to define/enforce trusted domains within the network 800. See, e.g., the exemplary DCAS apparatus and methods described in co-owned U.S. patent application Ser. No. 11/584,208 entitled "DOWNLOADABLE SECURITY AND PROTECTION METHODS AND APPARATUS" filed Oct. 20, 2006 and issued as U.S. Pat. No. 8,520,850 on Aug. 27, 2013, incorporated herein by reference in its entirety.

The media bridge 200 may also contain a secure microprocessor (e.g., security processor; not shown) which supports the trusted domain (such as, e.g., the Time Warner Cable Authorized Service Domain (ASD)). The bridge 200 can transfer content from the Authorized Service Domain (ASD) to the DRM license domain for content viewed on the various CPE 106 and PMD 202. One exemplary ASD configuration useful with the present invention is described in co-owned U.S. patent application Ser. No. 11/592,054 entitled "Methods and Apparatus for Premises Content Distribution" filed Nov. 1, 2006 and issued as U.S. Pat. No. 8,732,854 on May 20, 2014, incorporated herein by reference in its entirety.

The bridge apparatus 200 may also provide translation from different encryption environments if required, such as from 3DES to the AES cipher.

The media bridge 200 may also be configured to receive and store security packages associated with encrypted content from PMD 202. The media bridge 200 delivers these security packages (and content) to the CPE 106 in the premises for playback. For example, encrypted content and security packages stored at the PMD 202 may, via the media bridge 200 be delivered to STB 802*a*. The media bridge 200 can also stream content or other data retrieved from the PMD 202 and stored on a local storage device (not shown) to the CPE 106 of the network 800. The media bridge 200 can also stream content to multiple CPE 106 simultaneously from a single instance of the UPnP AV server, and supports Internet Group Management Protocol (IGMP) "snooping". The bridge apparatus 200 may also be configured to be resistant/resilient to denial of service attacks on all WAN and HLAN interfaces.

Business/Operational Rules Engine—

In another aspect of the invention, a processing entity (e.g., rendered as one or more computer programs disposed on a head-end server or entity (e.g., VOD server/SRM), at the media bridge 200, or other location) includes a so-called "rules" engine. This engine comprises, in an exemplary embodiment, one or more software routines adapted to control the operation of the media bridge 200 (and in some cases devices connected thereto, such as the PMD or premises network CPE) in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues), more subscriber "views" of given content, broader distribution of content (including to mobile devices that would not otherwise be served by the network), and so forth.

These rules may comprise a separate entity or process, and may also be fully integrated within other processing entities (such as the aforementioned media bridge web application), and controlled via e.g., a GUI on a PC 806 connected to the media bridge 200 or server, or a remote node such as one disposed at the headend 150 of the distribution network (see FIG. 7). In effect, the rules engine comprises a supervisory entity which monitors and selectively controls the media bridge 200 (and optionally premises network 800) operation processes at a higher level, so as to implement desired operational or business rules. The rules engine can be considered an overlay of sorts to the more fundamental algorithms used to accomplish required network operation, such as IP address assignment, and so forth.

For example, the network or media bridge 200 may invoke certain operational protocols or decision processes based on, direct or indirect user inputs to the bridge (e.g., via the bridge's UI if so equipped, or from a connected CPE 106), conditions existing within the network 800, demographic data, geographic data, etc. However, these processes may not always be compatible with higher level business or operational goals, such as maximizing profit or system reliability. Hence, when imposed, the business/operational rules can be used to dynamically (or manually) control the operation of the client process on the media bridge 200 or other devices within the premises (such as CPE 106 and/or PMD 202). The rules may be, e.g., operational or business-oriented in nature, and may also be applied selectively in terms of time of day, duration, specific local areas, or even at the individual user level (e.g., via specific identification of the CPE 106 or PMD 202 via TUNER_ID, MAC address, or the like).

For example, one rule implemented by the rules engine may comprise only providing certain types or formats of programming to certain subscribers or classes of subscribers. For example, a particular CPE 106 may possess an MPEG-4 or H.264 decoder; however programs rendered in MPEG-4 encoding may not be made available to the subscriber from the media bridge 200 unless the subscriber meets certain criteria (e.g., "premium" subscription, etc.). Similarly, if the subscriber did not possess a required codec, CA keys, or network interface of sufficient bandwidth, the enablement of such capability (such as via download of a missing codec or CA component) could be controlled to only subscribers meeting certain criteria.

The present invention also advantageously lends itself to various business models in terms of distribution, operation, and service provision. Specifically, by having remote monitoring, configuration and provisioning capability, the service provider (e.g., MSO) is given greater flexibility in, inter alia, (i) troubleshooting and repairing faults within the media bridge 200, PMD 202, CPE 106 or other connected premises devices which may otherwise require a service visit; (ii) changing or reconfiguring a given subscriber's service package or capabilities remotely, again obviating a service visit or actions by the subscriber; and (iii) extending the "reach" of content provided by the MSO within the user's premises, and the flexibility afforded the user to move content around between different devices they possess. For example, as previously described, any of the interfaces on the bridge apparatus 200 can be selectively enabled or disabled remotely, thereby allowing the MSO to rapidly switch service options on a per-subscriber (per premises) basis. Using DCAS or other technology, the bridge apparatus 200 can also be reconfigured as a trusted domain for protected content received over the cable or satellite receiver (tuner). New versions or upgrades of software/firmware can readily be downloaded and installed as well. UPNP or other server processes on the bridge apparatus 200 can be configured using the remote provisioning capability also.

Hence, one variant of the business methodology of the invention contemplates delivery of substantially similar hardware/firmware environments to all subscribers, with each subscriber being able to tailor the capabilities of their individual apparatus 200 (with, e.g., assistance or under control of the MSO) for their particular needs and premises. For example, some users may simply not want Wi-Fi capability; hence, this interface could be disabled by the MSO; others may not have installed coaxial cabling for establishing a cable premises network 800, and hence the MoCA interface could be disabled or simply not used. Others may have local recording devices (e.g., DVR or the like) which may require configuration of the trusted domain to extend to these devices to permit subscriber purchase and in-home "burning" of content according to the methods previously discussed herein with respect to U.S. patent application Ser. No. 11/080,693. Configuration of the bridge 200 may also be optimized based on the type(s) of PMD 202 used therewith; e.g., the bridge may be different with respect to protocols, capabilities, features, etc. for a subscriber with a Zune versus an iPod. As can be appreciated, literally an unlimited number of different premises/subscriber-specific configurations may be employed consistent with the aforementioned embodiments of the invention, and hence it is typically more economical and efficient to allow user-specified (or even user implemented if desired) reconfiguration of a substantially generic device, as opposed to custom configured hardware for each subscriber/premises.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Apparatus adapted to distribute media content within a network, said apparatus comprising:
   a first interface adapted to communicate with a first device, said first device configured to output or receive media content in a first format;
   a second interface adapted to communicate with a second device, said second device configured to output or receive media content in a second format;
   at least one converter apparatus adapted to convert media content between said first format and said second format;
   at least one translator apparatus adapted to translate one or more commands to control manipulation of said media content between a first protocol utilized by said first device and a second protocol utilized by said second device; and
   a processor apparatus adapted to: (i) access said first device, (ii) generate a webpage comprising a list of content in said first device, (iii) prioritize instances of said content in said list according to a quality-of-service (QoS) policy, (iv) after said prioritization, provide to said second device access to said list of content, and (v) implement said QoS policy for provision, from said first device to said second device, of at least one of said content selected from said list.

2. The apparatus of claim 1, wherein said media content comprises digitally compressed video content.

3. The apparatus of claim 1, further comprising an IEEE Std. 802.3af PoE compliant power distribution apparatus adapted to provide power at least to said first device.

4. The apparatus of claim 1, wherein said first device comprises a portable media device (PMD), said first format comprises an analog format, said second device comprises a customer premises equipment (CPE), and said second format comprises a digital format.

5. The apparatus of claim 4, wherein said PMD comprises at least one of:
   a video player application;
   cellular telephony interface; or
   a music player application.

6. The apparatus of claim 4, wherein:
   said first interface is adapted to receive media content from said first device in analog format;
   said converter apparatus is adapted to convert said media content from said analog format to digital format; and
   said second interface is adapted to transmit said digital format media content to said second device.

7. The apparatus of claim 6, wherein said first interface comprises at least one of a composite output interface or a stereo output interface, and said second interface comprises an Ethernet interface.

8. The apparatus of claim 6, wherein said second device is further associated with a premises network comprising a plurality of devices, said media content in said second format being made available to said plurality of devices via said second device.

9. The apparatus of claim 6, wherein:
   said second interface is further adapted to receive from said second device one or more commands to control playback of said media content in accordance with said second protocol; and
   said first interface is further adapted to transmit said one or more commands in accordance with said first protocol; and
   wherein said first interface comprises at least one of a Universal Serial Bus (USB) interface or a RS232 interface, and second interface comprises an Ethernet interface.

10. The apparatus of claim 1, wherein said first and second formats comprise first and second digital encodings, and said converter comprises a processor having a transcoding algorithm adapted to transcode one of said first and second formats to said second and first formats, respectively.

11. The apparatus of claim 1, wherein said second device is further associated with a premises network comprising a plurality of devices each configured to store a plurality of media content thereon, individual ones of said plurality of media content comprising said media content in said first format received at said apparatus via said second device.

12. A system for distribution of media content, said system comprising:
   a first device associated with a content distribution network and adapted to utilize said media content in a first format;

a second device adapted to utilize said media content in a second format;
a bridging apparatus, said bridging apparatus adapted to:
store first capability information of said first device and said second device in a media player database;
said media player database further configured to access one or more previously stored user-specific profiles to obtain second capability information in addition to or missing from said first capability information;
access said media content from said first device and said second device, said accessed media content comprising protection data configured to indicate that said media content cannot become a source of multiple viewable copies;
create a sortable list comprising said accessed media content;
receive a request for said media content element from said sortable list;
convert said media content between said first and second formats; and
deliver said media content and one or more rules associated therewith from one of said first or second devices to an other of said first or second devices in a format capable of being received thereon, said one or more rules configured to indicate one or more copies of said media content as un-viewable according to said protection data.

13. The system of claim 12, wherein said first device comprises consumer premises equipment (CPE), and said media content comprises content received from a content source within said content distribution network to which said CPE is in communication.

14. The system of claim 13, wherein said CPE comprises a coaxial cable interface to exchange said media content with other CPE within a premises served by a local network formed at least in part by said coaxial cable.

15. The system of claim 12, wherein said second device comprises a portable media device (PMD), and said media content comprises digitally compressed content stored thereon.

16. The system of claim 12, wherein said bridging apparatus further comprises a storage entity adapted to store said media content from at least one of said first and second devices, and said delivery of said content comprises delivery from said storage entity.

17. The system of claim 12, wherein said bridging apparatus is further adapted to enable said first device to utilize one or more trick mode operations in playback of said media content from said second device.

18. The system of claim 12, wherein:
said accessed media content is sorted within said sortable list based at least in part on content type, said content type prioritized according to a quality-of-service (QoS) policy; and
said delivery of said media content comprises implementation of said QoS policy therefor.

19. The system of claim 12, wherein said bridging apparatus is further adapted to:
identify a cable connection type; and
configure one or more ports to make use of said identified cable connection type.

20. The system of claim 19, wherein said configuration of said one or more ports comprises configuration of one or more Media Dependent Interface (MDI) ports via automatic wire switching to make use of said identified cable connection type, said one or more MDI ports configured to automatically detect a required cable connection type and configure said bridging apparatus to utilize said required cable connection type.

21. The system of claim 12, further comprising a secure processing apparatus, said secure processing apparatus configured to support a trusted domain, wherein said other of said first or second devices to which said media content is delivered is outside of said trusted domain.

22. The system of claim 12, wherein said bridging apparatus is further adapted to:
receive one or more commands in accordance with a first protocol utilized by said first device, said one or more commands being utilized to control playback of said delivered media content on said second device;
transcode said one or more commands from said first protocol to a second protocol utilized by said second device; and
cause control of said second device via said second protocol.

23. A method of controlling playback of media content on a first device, said method comprising:
sending a request from a content bridge for said media content located on said second device, said media content comprising an encrypted copy of said media content;
causing said second device to: (i) decrypt said encrypted copy of said media content, (ii) re-encrypt said decrypted copy of said media content, and (iii) provide access to said re-encrypted copy of said media content to said content bridge, said content bridge configured to read copy protection data of said re-encrypted copy of said media content, said copy protection data comprising an indicator that said media content cannot become a source of multiple viewable copies;
receiving at said content bridge said one or more commands from said first device, said one or more commands being associated with one or more actions for controlling a use of said media content, said first device transmitting said one or more commands in a first protocol;
determining whether said one or more commands are allowed based on at least said copy protection data of said re-encrypted copy of said media content; and
when said one or more commands are allowed: (i) translating said one or more commands from said first protocol to a second protocol, said second protocol comprising at least a protocol utilized by said second device, and (ii) transmitting said translated one or more commands to said second device, causing said second device to execute said one or more actions thereby controlling said use of said media content according to said one or more commands entered at said first device, and causing said second device to indicate said encrypted copy and said decrypted copy as un-viewable according to said indicator of said copy protection data.

24. The method of claim 23, wherein:
said first device comprises a cable or satellite network customer premises equipment (CPE);
said first protocol comprises Universal Plug and Play (UPnP) protocol;
said second devices comprises a portable media device (PMD); and
said second protocol comprises a serialized accessory protocol.

25. The method of claim 24, wherein said act of receiving said one or more commands comprises receiving said one or more commands via an Ethernet interface; and said act of transmitting said translated one or more commands to said second device comprises transmitting via at least one of: (i) an RS232 interface, and/or (ii) a Universal Serial Bus (USB) interface.

26. The method of claim 23, wherein:
said first device comprises a portable media device (PMD);
said first protocol comprises a serialized accessory protocol;
said second device comprises a customer premises equipment (CPE); and
said second protocol comprises Universal Plug and Play (UPnP) protocol.

27. The method of claim 26, wherein said act of receiving said one or more commands comprises receiving at least one of an 30-pin connector interface, and said act of transmitting said translated one or more commands to said second device comprises transmitting via a Multimedia Over Coax Alliance (MoCA) or Ethernet interface.

28. A method of distributing content within a premises network via a bridge, said bridge comprising a web server process, said method comprising:
establishing data communication with a first device at said bridge;
accessing a list of content elements associated with said first device;
creating a webpage comprising a plurality of records relating to said content elements, said webpage further comprising an embedded media player and associated controls;
determining, via said media bridge, whether one or more prerequisites are needed to run an interface on a second device, said second device in data communication with said bridge;
based at least in part on said determining, publishing said webpage to said second device, said second device configured to enable selection of at least one of said plurality of records via at least said interface;
retrieving one of said content elements corresponding to said selected at least one of said plurality of records;
converting said retrieved content element into a format suitable for display via said webpage;
causing said webpage to render said retrieved and converted content element;
monitoring, by a server apparatus disposed at a headend of a content distribution network in communication with said premises network, operations of a plurality of devices, said plurality of devices comprising said bridge;
obtaining status information of said plurality of devices by said server apparatus;
updating applications configured to run on said bridge, said applications comprising said web server process; and
configuring and provisioning said plurality of devices by said server apparatus.

29. The method of claim 28, wherein said data communication with said first device comprises data communication via a first interface, and data communication with said second device comprises data communication via a second interface different from said first interface.

30. The method of claim 28, wherein said content elements associated with said first device comprises content stored thereon.

31. The method of claim 28, wherein said content elements associated with said first device comprises content stored on a third device in communication with said first device.

32. The method of claim 28, wherein said act of converting said retrieved content element comprises determining at least one content format type that said second device is capable of both receiving and utilizing.

33. The method of claim 32, wherein said act of determining comprises receiving a profile comprising one or more compatible formats from said second device.

34. The method of claim 28, wherein said content element comprises associated security data, said security data being used authenticate at least one of said first and second devices to said bridge before said content element can be rendered or recorded by said first or said second device.

35. A method of distributing content within a premises network via a bridging apparatus, said method comprising:
establishing communication with a first device at said bridging apparatus via a network interface;
accessing a list of content elements associated with said first device;
creating a webpage comprising a plurality of records relating to said content elements;
prioritizing said plurality of records relating to said content elements according to a quality-of-service (QOS) policy;
publishing said webpage to a second device in communication with said bridging apparatus, said second device configured to select at least one of said plurality of records;
retrieving one of said content elements corresponding to a selected one of said plurality of records;
converting said retrieved content element into a format suitable for display via said webpage;
implementing said QOS policy for provision of said retrieved content element; and
causing said webpage to render said retrieved content element.

36. The method of claim 35, further comprising:
monitoring operations by a server apparatus disposed at a headend of a content distribution network in communication with said premises network of a plurality of devices, said plurality of devices comprising said bridging apparatus;
obtaining status information of said plurality of devices by said server apparatus;
updating applications configured to run on said bridging apparatus, said applications comprising said web server process; and
configuring and provisioning said plurality of devices by said server apparatus.

37. A method of providing access to media content to a portable client device via a premises network, said method comprising:
creating a database comprising available content accessed from one or more apparatus in data communication with said portable client device;
prioritizing said available content in said database according to a quality-of-service (QoS) policy;
in response to said request issued from said portable device to access one or more of said available content from said database, obtaining said requested one or more of said available content from a storage entity, said requested one or more of said available content being associated with a plurality of copy protection rules, said copy protection rules comprising data indicative that said one or more of said available content cannot become a source of multiple viewable copies; and selectively providing to said portable device at least one of a plurality of types of access to said one or more of said available content based at least in part on one or more of said copy protection rules, said provision based at least in part on one or more of said copy protection rules comprising: (i) indicating one or more copies of said one or more of said available content as unviewable, and (ii) implementing said QoS policy.

* * * * *